United States Patent
Abouelseoud et al.

(10) Patent No.: US 10,531,412 B2
(45) Date of Patent: Jan. 7, 2020

(54) ON DEMAND ROUTE SYNCHRONIZATION AND BEAMFORMING IN WIRELESS NETWORKS

(71) Applicant: SONY CORPORATION, Tokyo (JP)

(72) Inventors: Mohamed Abouelseoud, San Francisco, CA (US); Kazuyuki Sakoda, Campbell, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/919,465

(22) Filed: Mar. 13, 2018

(65) Prior Publication Data

US 2019/0141645 A1 May 9, 2019

Related U.S. Application Data

(60) Provisional application No. 62/581,827, filed on Nov. 6, 2017.

(51) Int. Cl.
*H04W 56/00* (2009.01)
*H04W 76/14* (2018.01)
(Continued)

(52) U.S. Cl.
CPC .......... *H04W 56/001* (2013.01); *H04L 41/12* (2013.01); *H04L 67/12* (2013.01); *H04W 12/06* (2013.01);
(Continued)

(58) Field of Classification Search
CPC ... H04W 56/001; H04W 12/06; H04W 76/14; H04W 84/18; H04W 16/28; H04L 41/12; H04L 45/02; H04L 45/64; H04L 45/32
See application file for complete search history.

(56) References Cited

U.S. PATENT DOCUMENTS 7,664,055 B2 2/2010 Nelson
8,310,936 B2 11/2012 Li et al.
(Continued)

FOREIGN PATENT DOCUMENTS

CN 101471940 B 7/2009
CN 104540212 A 4/2015
EP 2 760 233 A1 7/2014

OTHER PUBLICATIONS

ISA/EP, European Patent Office (EPO), International Search Report and Written Opinion dated Feb. 4, 2019, related PCT international application No. PCT/IB2018/058460, pp. 1-12, claims searched, pp. 13-17.

*Primary Examiner* — Brian T O Connor
(74) *Attorney, Agent, or Firm* — O'Banion & Ritchey LLP; John P. O'Banion

(57) ABSTRACT

Wireless communication is performed by stations (nodes) in a wireless mesh network by forming nodes into a mesh network without the need of network-wide synchronization and without needing to form active links between potential neighbors. Nodes obtain information on neighbors in the network by listening to transmitted beacons from these nearby nodes. Synchronization and active links are established when a data transmission session is triggered and initiated by the route setup process. The link formation process performed when establishing a new route performs both beamforming and synchronization. In situations in which a new route does not intersect other active routes then independent synchronization is performed; but when intersecting routes exist, the new route is synchronized with all intersecting routes where nodes are configured to serve both routes.

20 Claims, 34 Drawing Sheets

(51) Int. Cl.
*H04L 12/24* (2006.01)
*H04W 12/06* (2009.01)
*H04W 40/02* (2009.01)
*H04L 29/08* (2006.01)
*H04L 12/751* (2013.01)
*H04L 12/721* (2013.01)
*H04L 12/715* (2013.01)
*H04W 16/28* (2009.01)
*H04W 84/18* (2009.01)
*H04W 8/00* (2009.01)

(52) U.S. Cl.
CPC ........... *H04W 40/02* (2013.01); *H04W 76/14* (2018.02); *H04L 45/02* (2013.01); *H04L 45/32* (2013.01); *H04L 45/64* (2013.01); *H04W 8/005* (2013.01); *H04W 16/28* (2013.01); *H04W 84/18* (2013.01)

(56) References Cited

U.S. PATENT DOCUMENTS

| | | | | |
|---|---|---|---|---|
| 8,743,838 B2 * | 6/2014 | Gong | ................... | H04B 7/0617 370/334 |
| 8,989,144 B2 | 3/2015 | Lee et al. | | |
| 9,025,461 B2 * | 5/2015 | Krishnamurthy | ..... | H04W 40/10 370/236 |
| 9,807,619 B2 * | 10/2017 | Tsai | ...................... | H04W 16/14 |
| 10,045,197 B1 * | 8/2018 | Abdallah | .............. | H04W 8/005 |
| 2011/0064072 A1 | 3/2011 | Wang et al. | | |
| 2014/0036683 A1 * | 2/2014 | Krishnamurthy | ..... | H04W 40/10 370/236 |
| 2015/0109981 A1 * | 4/2015 | Patil | .................... | H04L 67/1078 370/311 |
| 2017/0013572 A1 | 1/2017 | Jayaraman | | |
| 2017/0041954 A1 * | 2/2017 | Tsai | ...................... | H04W 16/14 |
| 2017/0171729 A1 * | 6/2017 | Fox | ......................... | H04W 4/21 |
| 2017/0279506 A1 * | 9/2017 | Shattil | .................... | H04B 7/026 |
| 2017/0359789 A1 * | 12/2017 | McConnell | ........... | H04W 16/28 |
| 2017/0367002 A1 * | 12/2017 | Rubin | ..................... | H04W 12/08 |
| 2018/0014205 A1 * | 1/2018 | Tsai | ...................... | H04W 16/14 |
| 2018/0026695 A1 * | 1/2018 | Johnsson | ............. | H04B 7/0695 342/368 |
| 2018/0062975 A1 * | 3/2018 | Wang | .................. | H04W 40/246 |
| 2018/0270875 A1 * | 9/2018 | Hampel | ................ | H04W 40/00 |
| 2018/0302807 A1 * | 10/2018 | Chen | ....................... | H04L 45/22 |
| 2018/0332585 A1 * | 11/2018 | Faurie | ............... | H04W 72/1205 |
| 2018/0359678 A1 * | 12/2018 | Jones | ................... | H04W 40/12 |
| 2019/0007997 A1 * | 1/2019 | Shiotani | ................ | H04W 92/20 |
| 2019/0081766 A1 * | 3/2019 | Luo | ........................ | H04B 1/525 |

* cited by examiner

| Element ID | Length | Active Path Selection Protocol Identifier | Active Path Selection Metric Identifier | Congestion Control Mode Identifier | Synchronization Method Identifier | Authentication Protocol Identifier | Mesh Formation Info | Mesh Capability |
|---|---|---|---|---|---|---|---|---|
| 1 | 1 | 1 | 1 | 1 | 1 | 1 | 1 | 1 |

Octets:

FIG. 4
(Prior Art)

| Frame control | Duration | RA | TA | SSW | SSW Feedback | FCS |
|---|---|---|---|---|---|---|

Octets:   2    2   6  6   3    3    4

| Direction | CDOWN | Sector ID | DMG Antenna ID | RXSS Length |
|---|---|---|---|---|

Bits:   1      9       6       2       6

| Total sectors in ISS | Number of RX DMG antennas | Reserved | Poll Required | Reserved |
|---|---|---|---|---|

Bits:   9       2        5      1     7

| Sector select | DMG Antenna select | SNR report | Poll Required | Reserved |
|---|---|---|---|---|

Bits:   6      2         8      1     7

FIG. 9B
(Prior Art)

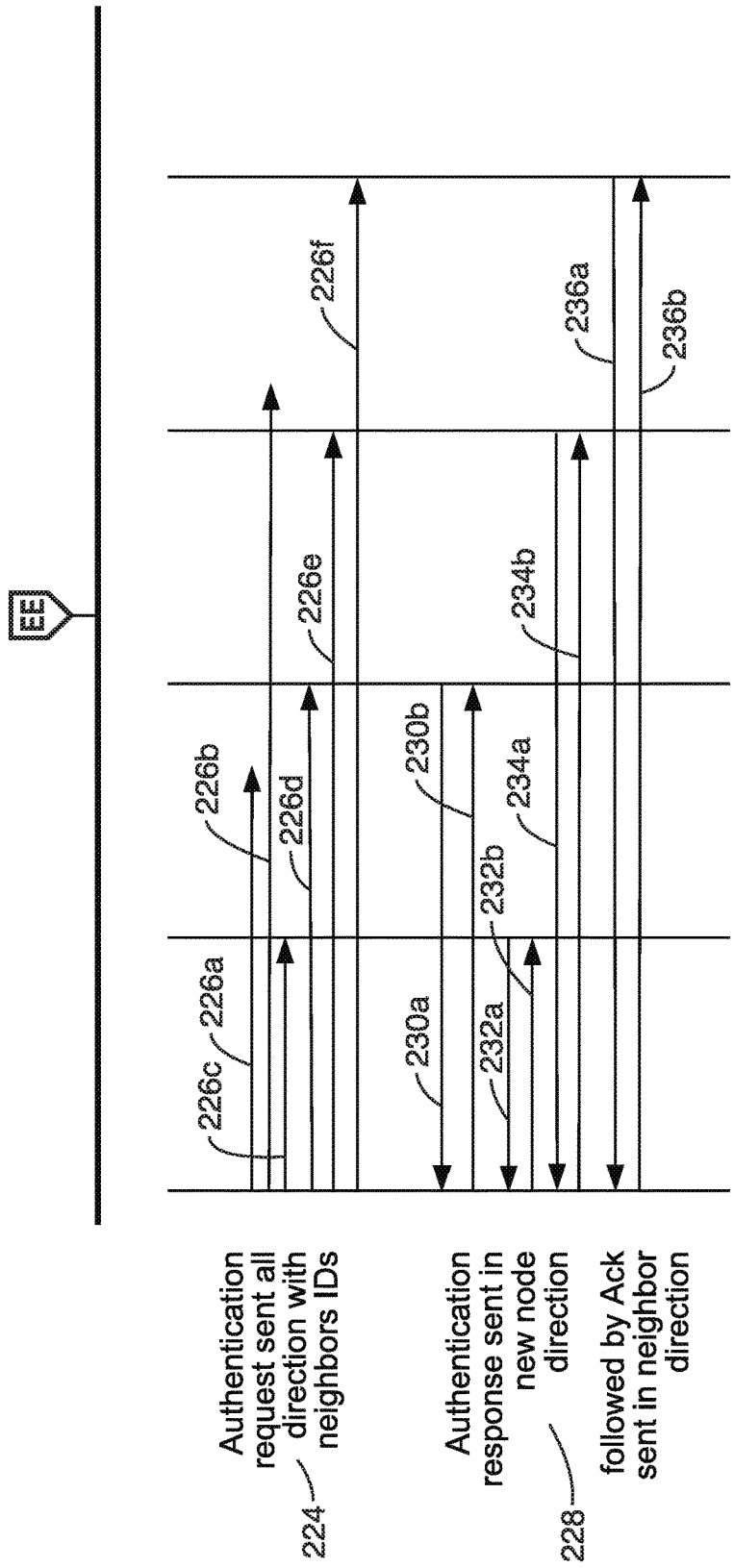

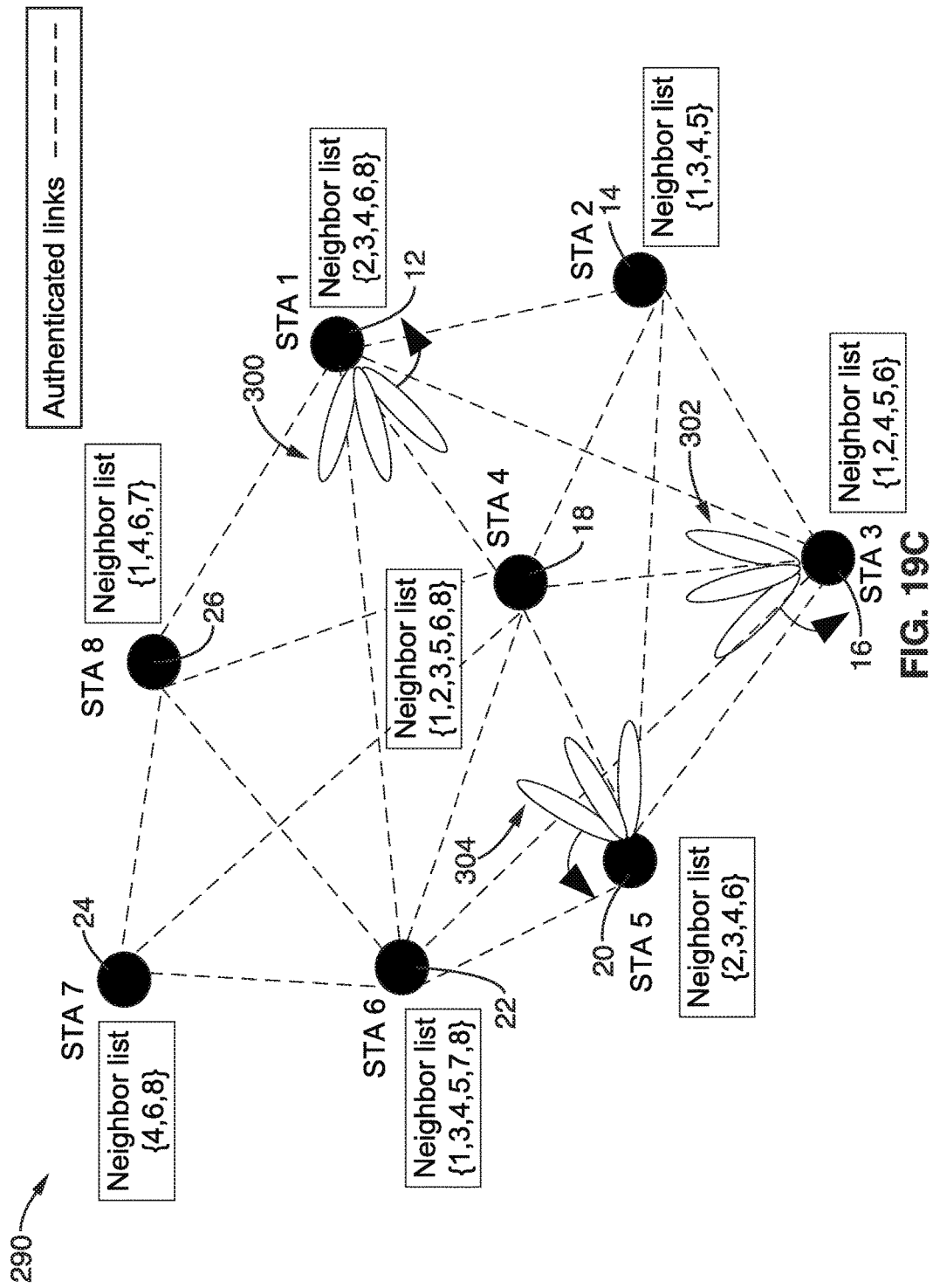

| RREQ regular fields | Neighbors ID list | Neighbor best TX beam list | Total number of TX training sectors | Total number of RX training sectors | Number of training cycles | DMG antenna Reciprocity |

FIG. 26 — 470

| RRES regular fields | Neighbors ID list | Neighbor best TX beam list | Total number of TX training sectors | Total number of RX training sectors | Number of training cycles | DMG antenna Reciprocity |

FIG. 27 — 480

ON DEMAND ROUTE SYNCHRONIZATION AND BEAMFORMING IN WIRELESS NETWORKS

CROSS-REFERENCE TO RELATED APPLICATIONS

This application claims priority to, and the benefit of, U.S. provisional patent application Ser. No. 62/581,827 filed on Nov. 6, 2017, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to directional wireless communications between stations, and more particularly to performing on demand synchronization and beamforming.

2. Background Discussion

Wireless networks in the millimeter wavelength (mmwave or mmW) regime are becoming increasingly important. Due to the need of higher traffic capacity, network operators have begun to embrace the idea of densification. Current sub-6 GHz wireless technology is not sufficient to cope with the high demand for data. One easy alternative is utilizing more spectrum in the 30-300 GHz band which is referred to as the millimeter wave band (mmW).

Enabling mmW wireless systems in general requires properly dealing with the channel impairments and propagation characteristics of the high frequency bands. High free-space path loss, high penetration, reflection and diffraction losses reduce the available diversity and limit non-line-of-sight (NLOS) communications.

The small wavelength of mmW enables the use of high-gain electronically steerable directional antennas of practical dimensions. This technology can provide enough array gain to overcome path loss and ensure high Signal-to-Noise Ratio (SNR) at the receiver. Using directional mesh networks in dense deployment environments and the mmW band provides an efficient way to achieve reliable communication between nodes and overcome line-of-sight restriction channel restrictions.

A new communication node (station) starting up in an area will be searching for neighboring nodes to discover and a network to join. The process of initial access of a node to a network comprises scanning for neighboring nodes and discovering all active local nodes. This can be performed either through the new node searching for a specific network/list of networks to join or the new node sends a broadcast request to join any already established network that will accept the new node.

A node connecting to a mesh network needs to discover all neighboring nodes to decide on the best way to reach a gateway/portal mesh node and the capabilities of each of these neighboring nodes. The new node examines every channel for possible neighboring nodes for a specific period of time. If no active node is detected after that specific time, the node moves to the next channel.

When a node is detected, the new node needs to collect sufficient available information to configure itself (its PHY layer) for operation in the regulatory domain. This task is further challenging in mmWave communications due to directional transmissions. The challenges in this process can be summarized as: (a) knowledge of surrounding nodes IDs; (b) knowledge of best transmission pattern for beamforming; (c) keeping the whole network in synchronization the whole time; (d) channel access issues due to collisions and deafness; and (e) channel impairments due to blockage and reflections.

Thus, improved neighborhood discovery methods are sought to overcome some or all of the above issues to enable pervasiveness of mmWave D2D and mesh technologies. However, existing technologies for mesh networking address mesh discovery solutions for networks operating in broadcast mode but are largely not targeted to networks having directional wireless communications.

Accordingly, a need exists for enhanced synchronization and beamforming mechanisms within wireless communication networks. The present disclosure fulfills that need and provides additional benefits over previous technologies.

BRIEF SUMMARY

A wireless communication circuit (station, node) with associated programming configured for wirelessly communicating with other wireless communication stations (nodes) comprising directional millimeter-wave (mmW) communications having a plurality of antenna pattern sectors each having different transmission directions. The station operates as a peer station on the mesh network for establishing and retaining associations with neighboring peer stations on the mesh network. The nodes are formed into a mesh network without the need of network-wide synchronization, and without the need to form active links between potential neighbors (links that are used for transmitting data, monitored and maintained). Thus, synchronization and active links are established once a data transmission session is triggered and initiated by the route setup procedure.

Connectivity of nodes in this steady state provides that nodes are aware of their neighbors, such as within their neighbor list, and may have additional information about neighbor capabilities and locations without beamforming or actually connecting to these neighbors. Nodes become aware of these neighbors by listening to transmitted beacons from nearby nodes. Each node transmits beacons in all direction at specific beacon transmission intervals. Nodes are not required to form active links with other nodes receiving their beacons unless a route or data session is initiated by a node that intends to establish an end-to-end connection with at least one other node.

The present disclosure provides a number of benefits, including both improved link budget and MAC efficiency, while reducing communications collisions at the AP. There is also a reduced need for extending BF training into the data transmission interval (DTI). Furthermore, overhead is reduced for the exchanging of explicit scheduling information from the AP to the STAs.

A number of terms are utilized in the disclosure whose meanings are generally described below.

A-BFT: Association-Beamforming Training period; a period announced in the beacons that is used for association and BF training of new stations (STAs) joining the network.

AP: Access Point; an entity that contains one station (STA) and provides access to the distribution services, through the wireless medium (WM) for associated STAs.

Beamforming (BF): a directional transmission that does not use an Omni-directional antenna pattern or quasi-omni directional antenna pattern. Beamforming is used at a transmitter to improve received signal power or signal-to-noise ratio (SNR) at an intended receiver.

BI: The Beacon Interval is a cyclic super frame period that represents the time between beacon transmission times.

BRP: BF refinement protocol; A BF protocol that enables receiver training and iteratively trains the transmitter and receiver sides to achieve the best possible directional communications.

BSS: Basic Service Set; a set of stations (STAs) that have successfully synchronized with an AP in the network.

BSSID: Basic Service Set Identification.

BHI: Beacon Header Interval which contains a beacon transmission interval (BTI) and association-beamforming training period (A-BFT).

BTI: Beacon Transmission Interval, is the interval between successive beacon transmissions.

CBAP: Contention-Based Access Period; the time period within the data transfer interval (DTI) of a directional multi-gigabit (DMG) BSS where contention-based enhanced distributed channel access (EDCA) is used.

DTI: Data Transfer Interval; the period whereby full BF training is permitted followed by actual data transfer. It can include one or more service periods (SPs) and contention-based access periods (CBAPs).

MAC address: a Medium Access Control (MAC) address.

MBSS: Mesh basic service set, A basic service set (BSS) that forms a self-contained network of Mesh Stations (MSTAs), and which may be used as a distribution system (DS).

MCS: Modulation and coding scheme; an index that can be translated into the PHY layer data rate.

MSTA: Mesh station (MSTA): A station (STA) that implements the Mesh facility. An MSTA that operates in the Mesh BSS may provide the distribution services for other MSTAs.

Omni-directional: a non-directional antenna mode of transmission.

Quasi-Omni directional: a directional multi-gigabit (DMG) antenna operating mode with the widest beamwidth attainable.

Receive sector sweep (RXSS): Reception of Sector Sweep (SSW) frames via different sectors, in which a sweep is performed between consecutive receptions.

RXBF: Receiver BeamForming.

SLS: Sector-level Sweep phase: a BF training phase that can include as many as four components: an Initiator Sector Sweep (ISS) to train the initiator, a Responder Sector Sweep (RSS) to train the responder link, such as using SSW Feedback and an SSW ACK.

SNR: received Signal-to-Noise Ratio in dB.

SP: Service Period; The SP that is scheduled by the access point (AP). Scheduled SPs start at fixed intervals of time.

Spectral efficiency: The information rate that can be transmitted over a given bandwidth in a specific communication system, usually expressed in bits/sec/Hz.

STA: Station; a logical entity that is a singly addressable instance of a medium access control (MAC) and physical layer (PHY) interface to the wireless medium (WM).

Sweep: a sequence of transmissions, separated by a short beamforming interframe space (SBIFS) interval, in which the antenna configuration at the transmitter or receiver is changed between transmissions.

SSW: Sector Sweep, is an operation in which transmissions are performed in different sectors (directions) and information collected on received signals, strengths and so forth.

Transmit Sector Sweep (TXSS): transmission of multiple Sector Sweep (SSW) or Directional Multi-gigabit (DMG) Beacon frames via different sectors, in which a sweep is performed between consecutive transmissions.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram depicting a mesh configuration element for an IEEE 802.11 WLAN.

FIG. 7 is a data field diagram depicting a sector sweep (SSW) frame element for IEEE 802.11ad.

FIG. 8 is a data field diagram depicting the SSW field within the SSW frame element for IEEE 802.11ad.

FIG. 9A and FIG. 9B are data field diagrams depicting SSW feedback fields shown when transmitted as part of an ISS in FIG. 9A, and when not transmitted as part of an ISS in FIG. 9B, as utilized for IEEE 802.11ad.

FIG. 16A and FIG. 16B is a message passing diagram of new node authentication of discovered beams through broadcasting according to an embodiment of the present disclosure.

FIG. 19A through FIG. 19C are node topology diagrams showing route response through broadcasting according to an embodiment of the present disclosure.

FIG. 26 is a data field diagram of the RREQ frame format according to an embodiment of the present disclosure.

FIG. 27 is a data field diagram of the RRES frame format according to an embodiment of the present disclosure.

DETAILED DESCRIPTION

1. Existing Directional Wireless Network Technology

1.1. WLAN Systems

In WLAN systems, 802.11 defines two modes of scanning; passive and active scanning. The following are the characteristics of passive scanning. (a) A new station (STA), attempting to join a network, examines each channel and waits for beacon frames for up to MaxChannelTime. (b) If no beacon is received, then the new STA moves to another channel, thus saving battery power since the new STA does not transmit any signal in scanning mode. The STA should wait enough time at each channel so that it does not miss the beacons. If a beacon is lost, the STA should wait for another beacon transmission interval (BTI).

The following are the characteristics of active scanning. (a) A new STA wanting to join a local network sends probe request frames on each channel, according to the following. (a)(1) STA moves to a channel, waits for incoming frames or a probe delay timer to expire. (a)(2) If no frame is detected after the timer expires, the channel is considered to be not in use. (a)(3) If a channel is not in use, the STA moves to a new channel. (a)(4) If a channel is in use, the STA gains access to the medium using regular DCF and sends a probe request frame. (a)(5) The STA waits for a desired period of time (e.g., Minimum Channel Time) to receive a response to the probe request if the channel was never busy. The STA waits for more time (e.g., Maximum Channel Time) if the channel was busy and a probe response was received.

(b) A Probe Request can use a unique service set identifier (SSID), list of SSIDs or a broadcast SSID. (c) Active scanning is prohibited in some frequency bands. (d) Active scanning can be a source of interference and collision, especially if many new STAs arrive at the same time and are attempting to access the network. (e) Active scanning is a faster way (more rapid) for STAs to gain access to the network compared to the use of passive scanning, since STAs do not need to wait for beacons. (f) In infrastructure basic service set (BSS) and IBSS, at least one STA is awake to receive and respond to probes. (g) STAs in mesh basic service set (MBSS) might not be awake at any point of time to respond. (h) When radio measurement campaigns are active, nodes might not answer the probe requests. (i) Collision of probe responses can arise. STAs might coordinate the transmission of probe responses by allowing the STA that transmitted the last beacon to transmit the first Probe Response. Other nodes can follow and use back-off times and regular distributed coordination function (DCF) channel access to avoid collision.

Figure 1:
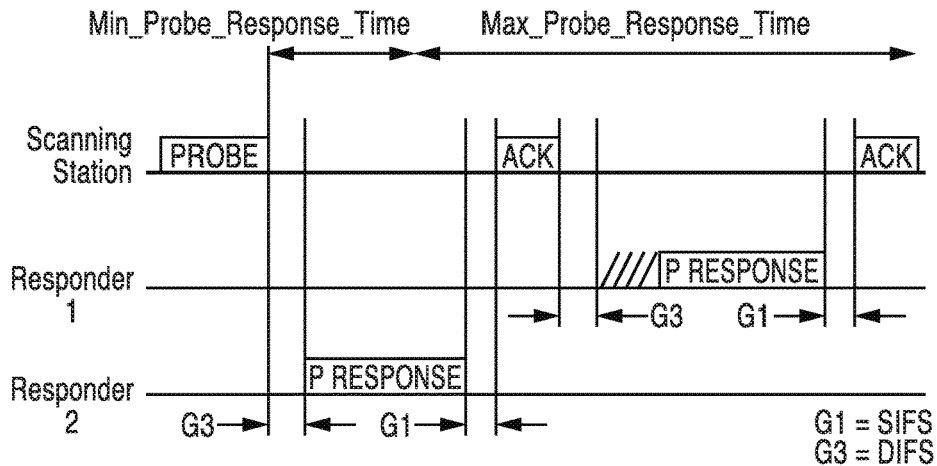
FIG. 1 is a timing diagram of active scanning performed in an IEEE 802.11 wireless local area network (WLAN).

FIG. 1 depicts the use of active scanning in an IEEE 802.11 WLAN, depicting a scanning station sending a probe and two responding stations which receive and respond to the probe. The figure also shows the minimum and maximum probe response timing. The values G1 is shown set to SIFS which is the interframe spacing prior to transmission of an acknowledgment, while G3 is DIFS which is DCF interframe spacing, represented the time delay for which a sender waits after completing a backoff period before sending an RTS package.

1.2. IEEE 802.11s Mesh WLAN

The IEEE 802.11s (hereafter 802.11s) is a standard that adds wireless mesh networking capabilities to the 802.11 standard. In 802.11s new types of radio stations are defined as well as new signaling to enable mesh network discovery, establishing peer-to-peer connection, and routing of data through the mesh network.

Figure 2:
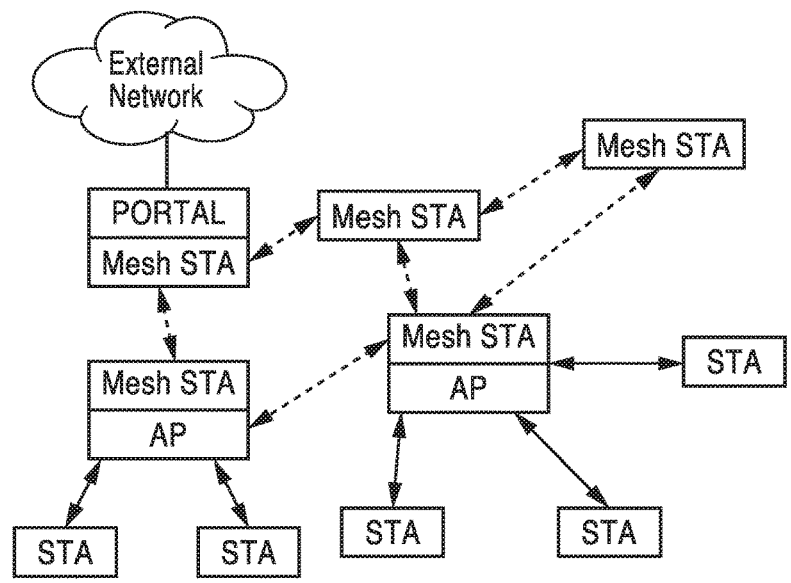
FIG. 2 is a node diagram for a mesh network showing a combination of mesh and non-mesh stations.

FIG. 2 illustrates one example of a mesh network where a mix of non-mesh STA connect to Mesh-STA/AP (solid lines) and Mesh STAs connect to other mesh STA (dotted lines) including a mesh portal. Nodes in mesh networks use the same scanning techniques defined in the 802.11 standard for discovering neighbors. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan.

When a mesh STA discovers a neighbor mesh STA through the scanning process, the discovered mesh STA is considered a candidate peer mesh STA. It may become a member of the mesh network, of which the discovered mesh STA is a member, and establish a mesh peering with the neighbor mesh STA. The discovered neighbor mesh STA may be considered a candidate peer mesh STA when the mesh STA uses the same mesh profile as the received Beacon or Probe Response frame indicates for the neighbor mesh STA.

The mesh STA attempts to maintain the discovered neighbor's information in a Mesh Neighbors Table which includes: (a) neighbor MAC address; (b) operating channel number; and (c) the most recently observed link status and quality information. If no neighbors are detected, the mesh STA adopts the Mesh ID for its highest priority profile and remains active. All the previous signaling to discover neighbor mesh STAs are performed in broadcast mode. It should be appreciated that 802.11s was not targeted for networks with directional wireless communications.

Figure 3:
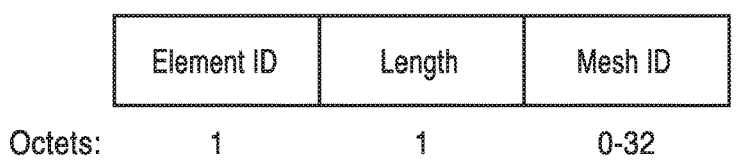
FIG. 3 is a data field diagram depicting a mesh identification element for an IEEE 802.11 WLAN.

FIG. 3 depicts a Mesh Identification element (Mesh ID element) which is used to advertise the identification of a Mesh Network. Mesh ID is transmitted in a Probe request, by a new STA willing to join a mesh network, and in beacon and signals, by existing mesh network STAs. A Mesh ID field of length 0 indicates the wildcard Mesh ID, which is used within a Probe Request frame. A wildcard Mesh ID is a specific ID that prevents a non-mesh STA from joining a mesh network. It should be recognized that a mesh station is a STA that has more features than a non-mesh station, for example, it is like having the STA running as a module in additional to some other modules to serve the mesh functionality. If the STA does not have this mesh module it should not be allowed to connect to a mesh network.

FIG. 4 depicts a Mesh configuration element as contained in Beacon frames and Probe Response frames transmitted by mesh STAs, and it is used to advertise mesh services. The main contents of the Mesh Configuration elements are: (a) a path selection protocol identifier; (b) a path selection metric identifier; (c) a congestion control mode identifier; (d) a synchronization method identifier; and (e) an authentication protocol identifier. The contents of the Mesh Configuration Element together with the Mesh ID form a mesh profile.

The standard 802.11a defines many procedures and mesh functionalities including: mesh discovery, mesh peering management, mesh security, mesh beaconing and synchronization, mesh coordination function, mesh power management, mesh channel switching, three address, four address, and extended address frame formats, mesh path selection and forwarding, interworking with external networks, intra-mesh congestion control and emergency service support in mesh BSS.

1.3. Millimeter Wave in WLAN

WLANs in millimeter wave bands generally require the use of directional antennas for transmission, reception or both, to account for the high path loss and to provide sufficient SNR for communication. Using directional antennas in transmission or reception makes the scanning process directional as well. IEEE 802.11ad and the new standard 802.11ay define procedures for scanning and beamforming for directional transmission and reception over the millimeter wave band.

1.4. IEEE 802.11ad Scanning and BF Training

An example of a mmWave WLAN state-of-the-art system is the 802.11ad standard.

1.4.1. Scanning

A new STA operates on passive or active scanning modes to scan for a specific SSID, a list of SSIDs, or all discovered SSIDs. To passively scan, a STA scans for DMG beacon frames containing the SSID. To actively scan: a DMG STA transmit Probe Request frames containing the desired SSID or one or more SSID List elements. The DMG STA might also have to transmit DMG Beacon frames or perform beamforming training prior to the transmission of Probe Request frames.

1.4.2. BF Training

BF training is a bidirectional sequence of BF training frame transmissions that uses a sector sweep and provides the necessary signaling to allow each STA to determine appropriate antenna system settings for both transmission and reception.

The 802.11ad BF training process can be performed in three phases. (1) A sector level sweep phase is performed whereby directional transmission with low gain (quasi-Omni) reception is performed for link acquisition. (2) A refinement stage is performed that adds receive gain and final adjustment for combined transmit and receive. (3) Tracking is then performed during data transmission to adjust for channel changes.

1.4.3. 802.11ad SLS BF Training Phase

This focuses on the sector level sweep (SLS) mandatory phase of the 802.11ad standard. During SLS, a pair of STAs exchange a series of sector sweep (SSW) frames (or beacons in case of transmit sector training at the PCP/AP) over different antenna sectors to find the one providing highest signal quality. The station that transmits first is called the initiator; the station that transmits second is referred to as the responder.

During a transmit sector sweep (TXSS), SSW frames are transmitted on different sectors while the pairing node (the responder) receives utilizing a quasi-Omni directional pattern. The responder determines the antenna array sector from the initiator which provided the best link quality (e.g., SNR).

Figure 5:
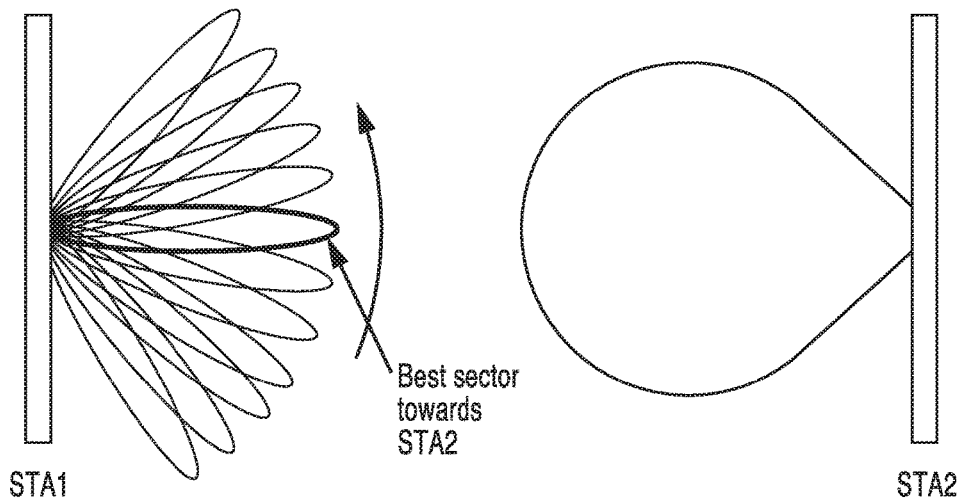
FIG. 5 is a schematic of antenna sector sweeping (SSW) in the IEEE 802.11ad protocol.

FIG. 5 depicts the concept of sector sweep (SSW) in 802.11ad. In this figure, an example is given in which STA 1 is an initiator of the SLS and STA 2 is the responder. STA 1 sweeps through all of the transmit antenna pattern fine sectors while STA 2 receives in a quasi-Omni pattern. STA 2 feeds back to STA 2 the best sector it received from STA 1.

Figure 6:
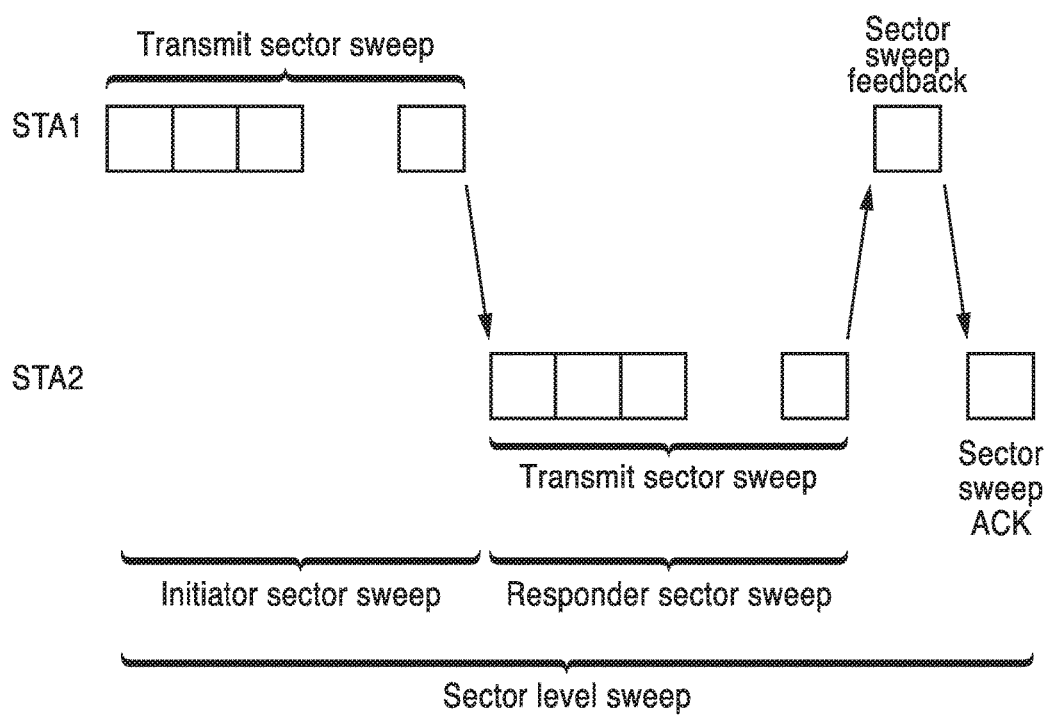
FIG. 6 is a signaling diagram showing signaling of sector-level sweeping (SLS) in the IEEE 802.11ad protocol.

FIG. 6 illustrates the signaling of the sector-level sweep (SLS) protocol as implemented in 802.11ad specifications. Each frame in the transmit sector sweep includes information on sector countdown indication (CDOWN), a Sector ID, and an Antenna ID. The best Sector ID and Antenna ID information are fed back with the Sector Sweep Feedback and Sector Sweep ACK frames.

FIG. 7 depicts the fields for the sector sweep frame (an SSW frame) as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame.

FIG. 8 illustrates data elements within the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

FIG. 9A and FIG. 9B depict SSW feedback fields. The format shown in FIG. 9A is utilized when transmitted as part of an Internal Sublayer Service (ISS), while the format of FIG. 9B is used when not transmitted as part of an ISS. The Total Sectors in the ISS field indicate the total number of sectors that the initiator uses in the ISS. The Number of RX DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The poll required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

2. Introduction to On-Demand Route Synchronization & Beamforming

2.1. Problem Statement

Timing synchronization function (TSF) is specified in IEEE 802.11 WLAN standard to fulfill timing synchronization among STAs. Timing synchronization is achieved by stations periodically exchanging timing information through beacon frames.

In (infra) BSS, the AP sends the TSF information in the beacons. A TSF keeps the timers for all stations in the same basic service set (BSS) synchronized.

In Independent Basic Service Set (IBSS, ad-hoc), each station competes to send the beacon. Each station maintains a TSF timer counting in increments of microseconds (µs). Stations adopt a received timing if it is later than the station's own TSF timer.

The current mmWave communication system highly relies on directional communication to gain sufficient link budget between transmitter and receiver. As seen in prior art, determination of proper beam for use requires significant signaling. AP transmits multiple beacon frames with transmit beamforming.

Beacons are transmitted all the time in all direction and periodically to announce the network, maintain synchronization and manage the network resources.

The current technology trend directs to finer beamforming, which allows higher antenna gain to secure better link budget. However, when the STA employs finer beams, STAs need to transmit even more frames to cover enough angle of transmission however it is required to reduce the overhead of beacon transmission for latency constraints.

When we think about forming a mesh network utilizing mmWave PHY technology, maintaining the whole network in sync is a very tight constrains and might not be needed. Especially when many nodes are connected to the mesh node but not actively transmitting or receiving data. Nodes might want to discover as many nodes as possible to maintain a backup list of nodes to connect to in case one path is not viable but synchronization with all the neighbors should not be strict.

2.2. Contribution of Present Disclosure

A network protocol is described to allow nodes discovering a network to register itself as a member of this network and once a traffic is initiated where this node need to be active, beamforming and synchronization are carried out.

Nodes list all potential neighbors through listening to their beacons and transmitting beacons to those nodes. Beamformed connections to potential neighbors are not maintained all the time.

Once a traffic is initiated, the nodes in the end to end traffic route are beamformed and synchronized throughout the route selection procedure.

Synchronization and beamforming are maintained for nodes that are part of an active data traffic route.

The clock master of the new data traffic route can be the traffic initiator node or any other node if the other node requests to be a clock master to sync with other data traffic the other node is part of.

3. Embodiments of Present Disclosure

3.1. Topology Under Study

Figure 10:
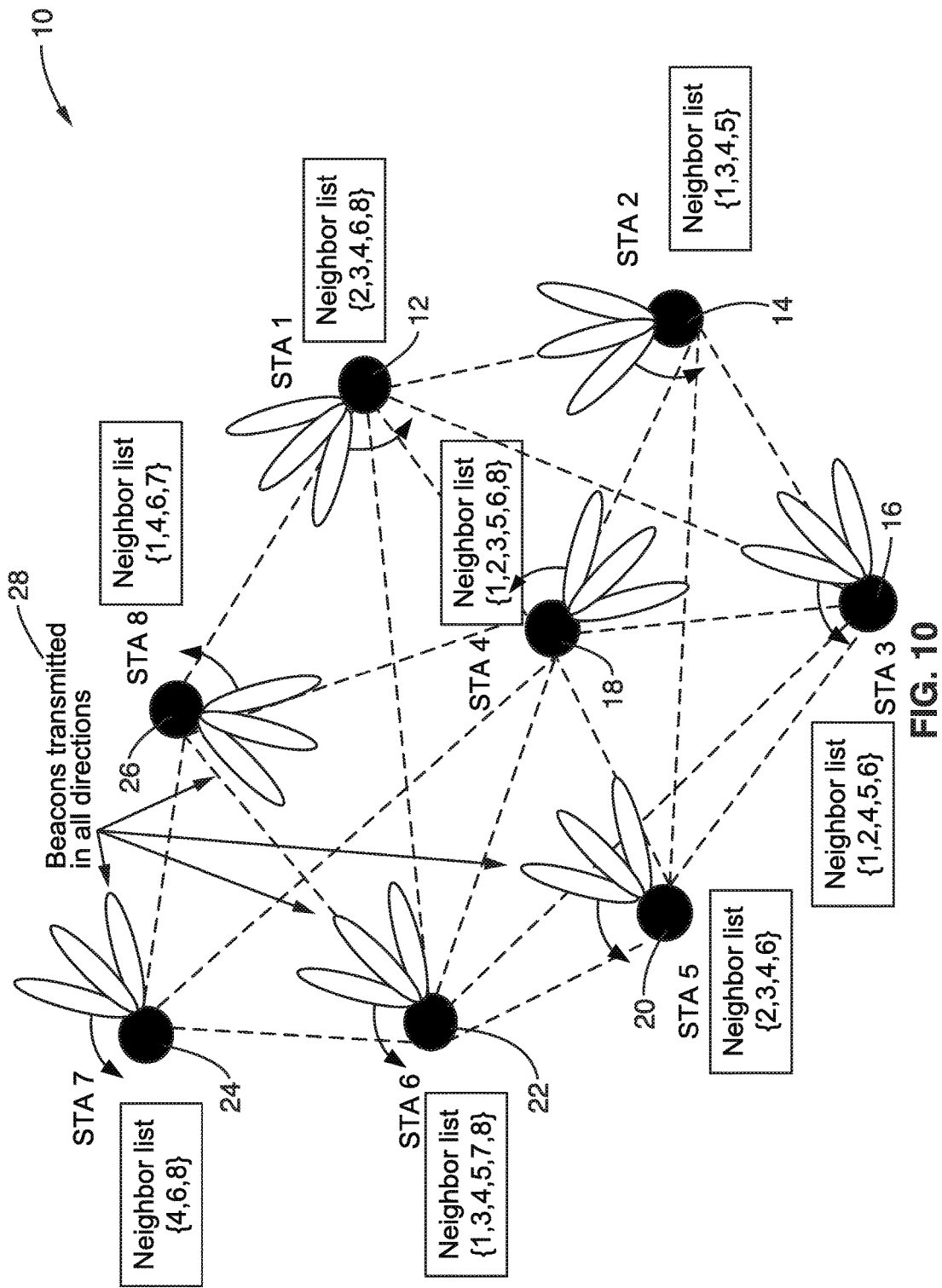
FIG. 10 is a wireless node topology example of wireless mmWave nodes in a wireless network as utilized according to an embodiment of the present disclosure.

FIG. 10 depicts a example network 10 topology under study where nodes are connected to each other in a mesh like topology, however no active links are established or maintained. In the figure are shown STA 1 (12), STA 2 (14), STA 3 (16), STA 4 (18), STA 5 (20), STA 6 (22), STA 7 (24) and STA 8 (26). A neighbor list is shown for each station, and the stations are shown transmitting 28 beacons in all directions.

The connectivity of the nodes in this steady state is such that nodes are aware of their existing neighbors (e.g., neighbor list) and might have some information about their capabilities and maybe locations without beamforming or actually connecting to these neighbors. Nodes are aware of the neighbors by listening to transmitted beacons of the nearby nodes. Each node is transmitting beacons in all direction at a specific beacon transmission interval. Nodes are not expecting to form active links (links that are used for transmitting data, monitored and maintained) with other nodes receiving their beacons unless a route or data session is initiated by a node that intends to establish an end-to-end connection with at least one other node.

Each node maintains a list of other nodes from which it can receive their beacons. The neighbor list of a node are authenticated to be part of the mesh network and to form a potential link with any of these neighboring nodes if needed. The list of the neighbors is updated once a new neighbor is discovered, or if a neighbor is gone out of the node coverage area, or if the node is turned off (or otherwise deactivated).

The creation of the neighbor list can be performed in any desired manner, such as through receiving a direction beacon from a neighboring node on the same band or through receiving a beacon on a different band or channel announcing the capability at the mmW band.

3.2. STA Hardware Configuration

Figure 11:
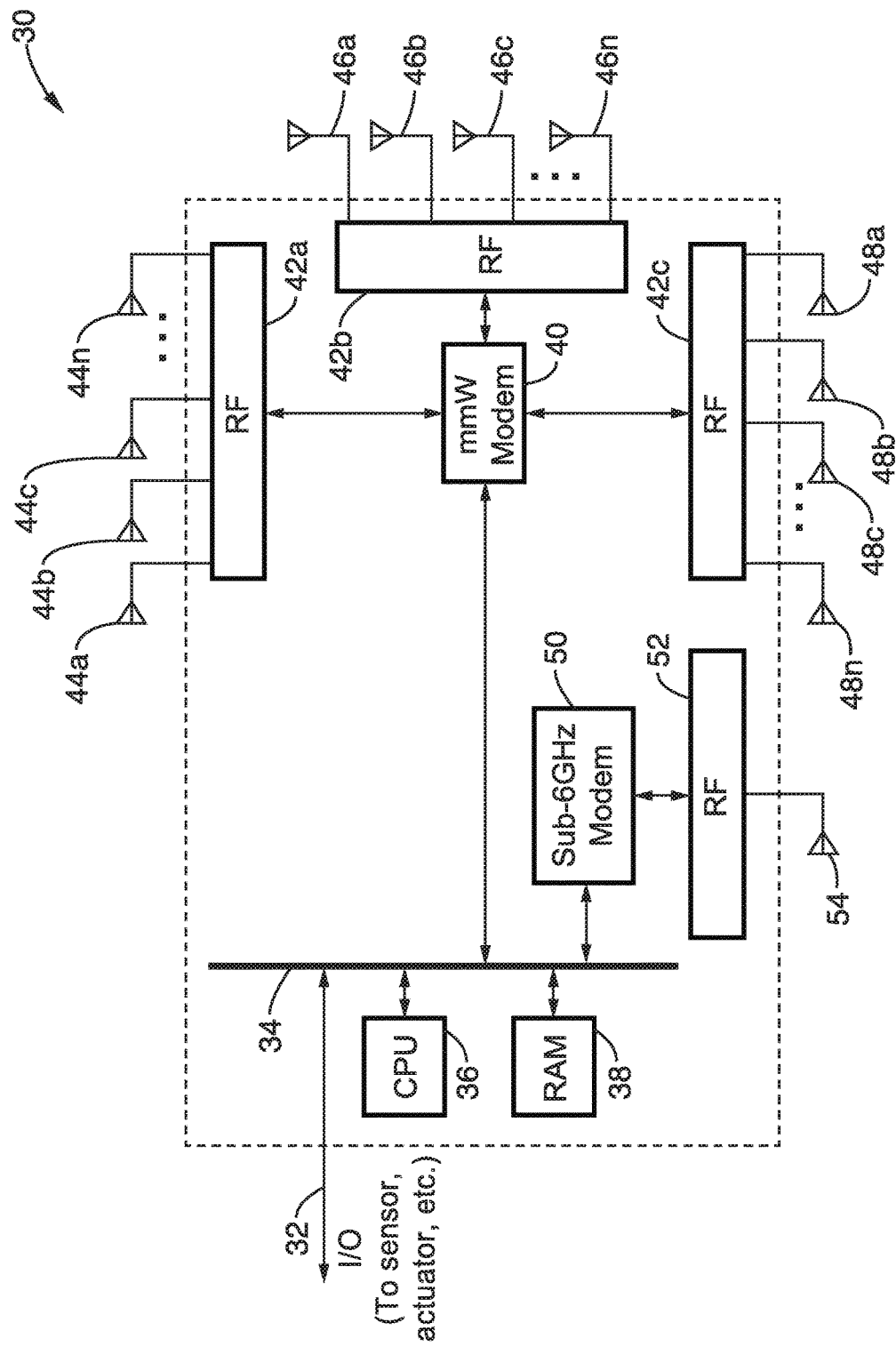
FIG. 11 is a block diagram of station hardware according to an embodiment of the present disclosure.

FIG. 11 illustrates an example embodiment 30 of the hardware configuration for a node (wireless station in the network). In this example a computer processor (CPU) 36 and memory (RAM) 38 are coupled to a bus 34, which is coupled to an I/O path 32 giving the node external I/O, such as to sensors, actuators and so forth. Instructions from memory are executed on processor 36 to execute a program which implements the communication protocols. This host machine is shown configured with a mmW modem 40 coupled to radio-frequency (RF) circuitry 42a, 42b, 42c to a plurality of antennas 44a, 44b, 44c through 44n, 46a, 46b, 46c through 46n, and 48a, 48b, 48c through 48n to transmit and receive frames with neighboring nodes. In addition, the host machine is also seen with a sub-6 GHz modem 50 coupled to radio-frequency (RF) circuitry 52 to antenna(s) 54.

Thus, this host machine is shown configured with two modems (multi-band) and their associated RF circuitry for providing communication on two different bands. The mmW band modem and its associated RF circuitries are configured for transmitting and receiving data in the mmW band. The sub-6 GHz modem and its associated RF circuitry are configured for transmitting and receiving data in the sub-6 GHz band.

Figure 12:
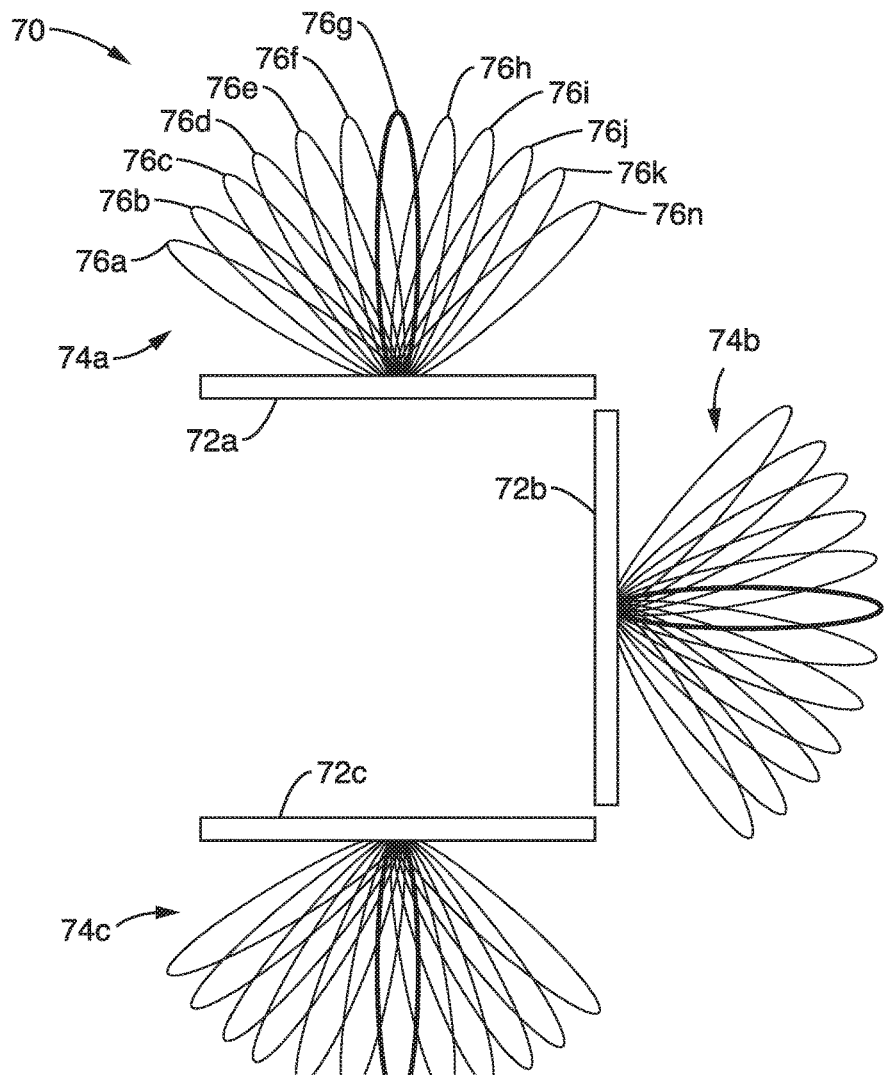
FIG. 12 is a beam pattern diagram generated by a mmW antenna system according to an embodiment of the present disclosure.

FIG. 12 illustrates an example embodiment 70 of mmWave antenna directions which can be utilized by a node to generate a plurality (e.g., 36) of mmWave antenna sector patterns. In this example, the node implements three RF circuits 72a, 72b, 72c and connected antennas, and each RF circuitry and connected antenna generate a beamforming pattern 74a, 74b, 74c. Antenna pattern 74a is shown having twelve beamforming patterns 76a, 76b, 76c, 76d, 76e, 76f, 76g, 76h, 76i, 76j, 76k and 76n ("n" representing that any number of patterns can be supported). The example station using this specific configuration has thirty six (36) antenna sectors. However, for the sake of clarity and ease of explanation, the following sections generally describe nodes having a smaller number of antenna sectors. It should be appreciated that any arbitrary beam pattern can be mapped to an antenna sector. Typically, the beam pattern is formed to generate a sharp beam, but it is possible that the beam pattern is generated to transmit or receive signals from multiple angles.

Antenna sector is determined by a selection of mmWave RF circuitry and beamforming commanded by the mmWave array antenna controller. Although it is possible that STA hardware components have different functional partitions from the one described above, such configurations can be deemed to be a variant of the explained configuration. Some of the mmWave RF circuitry and antennas may be disabled when the node determines it is unnecessary to communicate with neighbor nodes.

In at least one embodiment, the RF circuitry includes frequency converter, array antenna controller, and so forth, and is connected to multiple antennas which are controlled to perform beamforming for transmission and reception. In this way the node can transmit signals using multiple sets of beam patterns, each beam pattern direction being considered as an antenna sector.

Although in this example three RF circuitries are depicted as coupled to the mmW modem, it will be appreciated that an arbitrary number of RF circuitries can be coupled to the mmW modem. In general, larger numbers of RF circuitry will result in broader coverage of the antenna beam direction. The number of RF circuitries and number of antennas utilized is determined by hardware constraints of a specific device, and the application to which it is directed. Some of the RF circuitry and antennas may be disabled when the node determines it is unnecessary to communicate with neighbor nodes.

Figure 13:
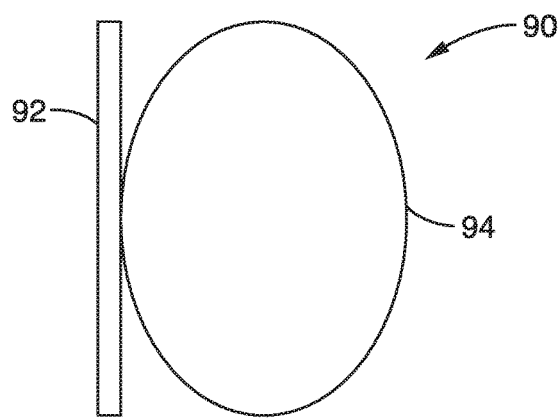
FIG. 13 is a beam pattern diagram generated by a sub 6 GHz antenna according to an embodiment of the present disclosure.

FIG. 13 illustrates an example embodiment 90 of antenna pattern for the sub-6 GHz modem assumed in this example to use a Quasi-Omni antenna 94 attached to its RF circuitry 92. It should be appreciated that other antenna pattern variations can be utilized without departing from the present teachings.

In at least one embodiment, the mmW RF circuitry includes frequency converter, array antenna controller, and so forth, and is connected to multiple antennas which are controlled to perform beamforming for transmission and reception. In this way the node can transmit signals using multiple sets of beam patterns, each beam pattern direction being considered as an antenna sector.

3.3. Network Formation

A new node trying to join the mesh network is configured for listening for beacons from neighboring nodes. The beacons announce the existence of neighbor nodes and can be transmitted in the same band the network is operating in, or in a different band.

The new node listens to all neighboring nodes to form its neighbor list before it starts acting as a mesh node. Once a beacon is found, the new node matches its mesh profile or SSID to its own, if the matching succeeds; the new node considers authenticating the link to the neighboring node. It will be noted that the described protocol requires that a new node or an existing node needs to authenticate any link for a new discovered neighbor before updating the neighbor list. If the link to a neighboring node is successfully authenticated, then the neighboring node is added to the neighbor list. If no neighbor is found, the new node might have the option to form its own mesh and transmit beacons. In the future the new node established mesh network (the new node and any other node connected to it) might join another mesh network if the mesh profile/SSID matches. Once the new node authenticates a link to a mesh node, it can start transmitting beacons with the mesh profile ID.

Figure 14A:
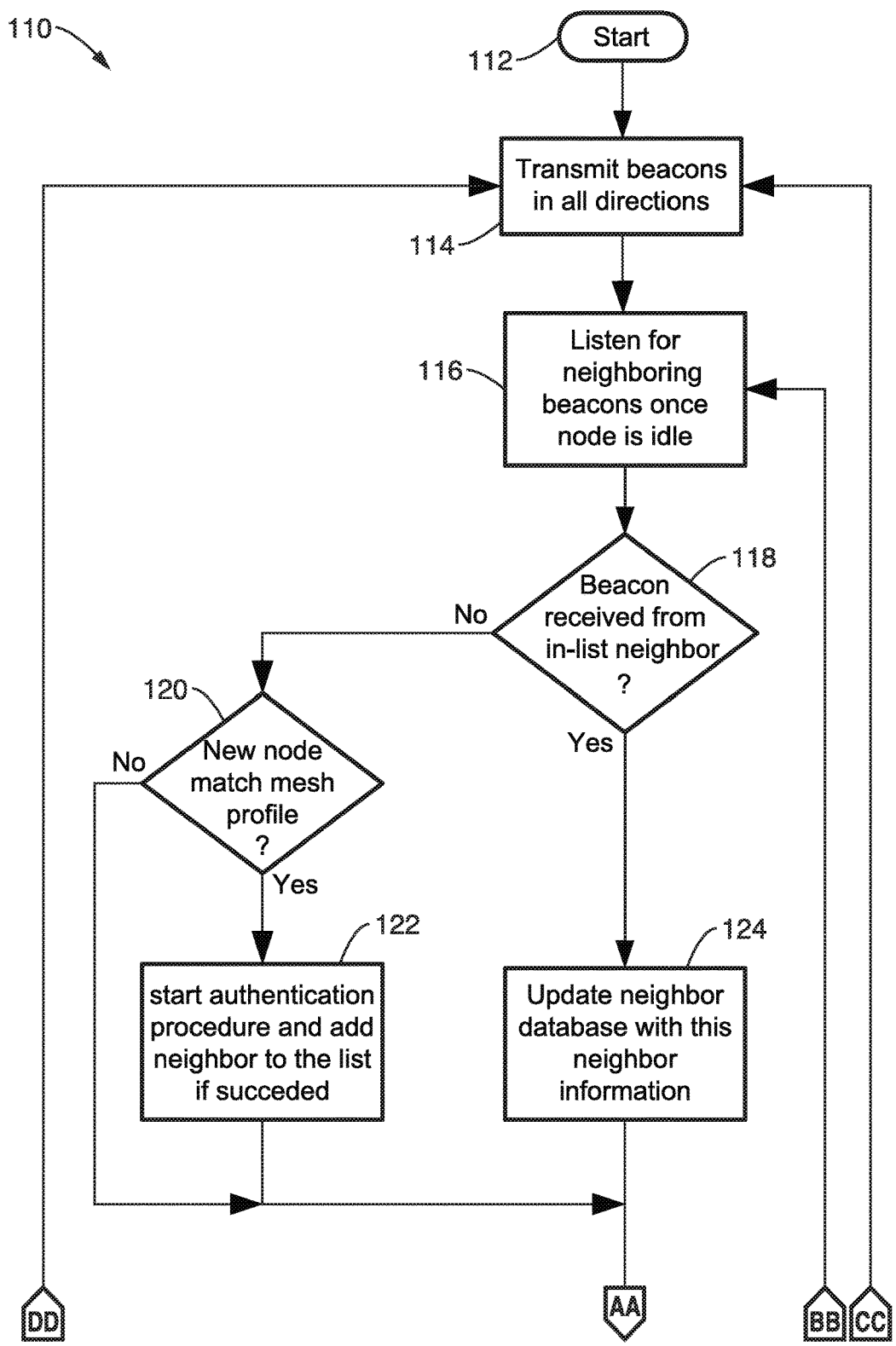
FIG. 14A and FIG. 14B is a flow diagram of a node managing a neighbor list according to an embodiment of the present disclosure.
Figure 14B:
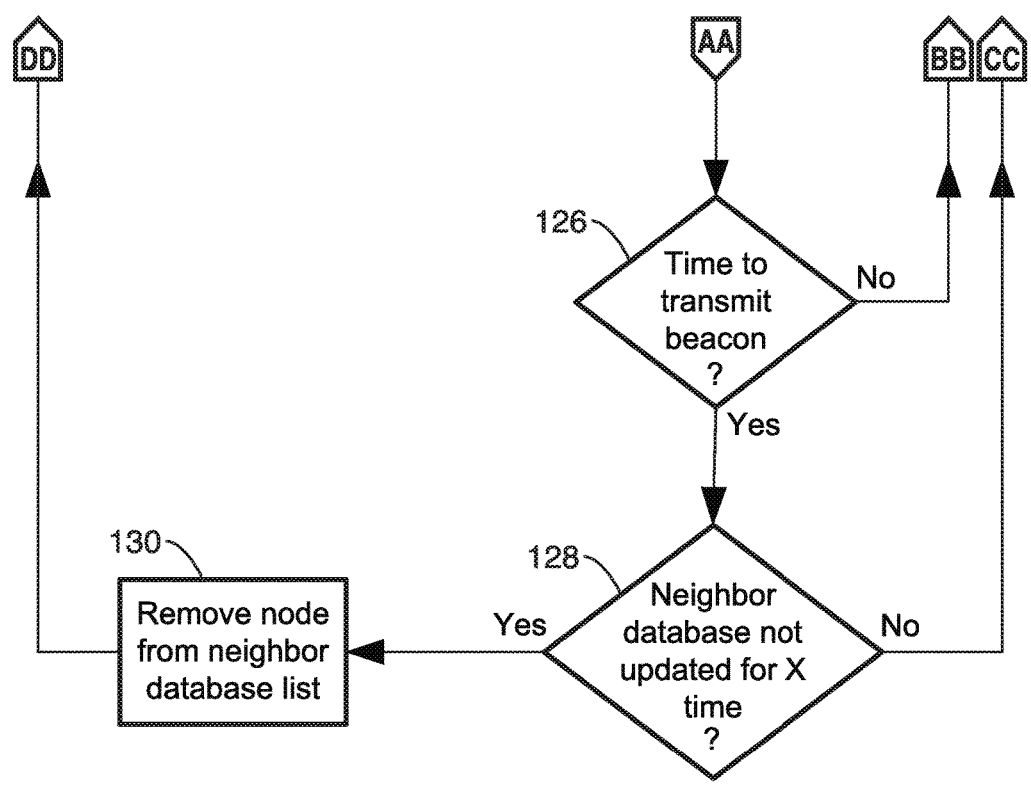

FIG. 14A and FIG. 14B illustrates an example embodiment 110 of this process for a mesh node handling the beacon transmission, and beacon reception for new nodes as well as mesh nodes. It should be appreciated that the programming for being executed on the wireless station (node) hardware (e.g., FIG. 11) is configured to operate in different modes or states (mesh node, new node and so forth), depending on the conditions and history.

The process starts 112 and a mesh node transmits 114 its beacon every beacon transmission interval, these beacons can be in-band or out-band beacons. At the time when the node is not active, it searches for ("listens") 116 to receive beacons from other nodes. A determination is made 118 if the received beacon belongs to a node in the mesh node neighbor's list. If the node is not in the list, then a check is made 120 to determine if the new node matches the mesh profile. If it does match the profile, then at block 122 authentication commences to add the neighbor to the list, with execution moving to block 126. Otherwise, if the new node is found in block 120 to not match the mesh profile, then execution moves directly to block 126. If in block 118, it is determined that the beacon was received from neighbor in the neighbor list, then at block 124 the neighbor list is updated with this neighbor information.

A check is made at block 126 if it is time for transmitting the next beacon. If not, then execution returns to block 116 in listening for beacons. If it is time to transmit the next beacon, the mesh node checks 128 the neighbor list (database) to determine if a node should be taken out of the list. If a neighboring node has not been heard from, beacon is not received for a long time or x number of beacon intervals, the mesh node clears 130 this node ID from the neighbor list.

In the following sections an example is shown of a three message handshaking authentication procedure. Two possible ways of authenticating discovered neighbors are considered: (1) authenticating without beamforming, and (2) authenticating after beamforming.

3.3.1. Authenticating without Beamforming

Figure 15A:
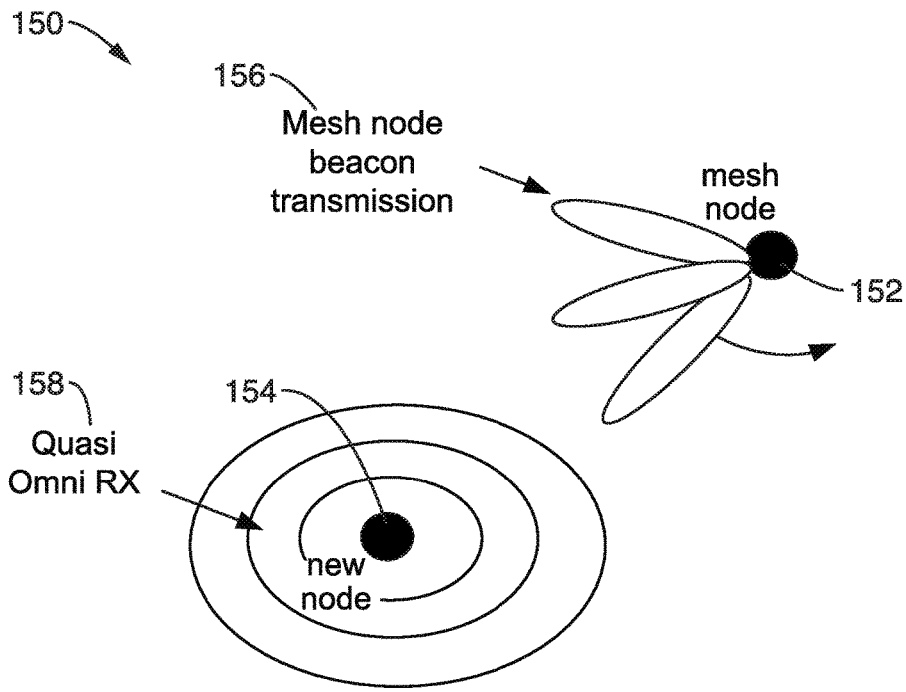
FIG. 15A through FIG. 15D are node topology diagrams showing an authentication procedure according to an embodiment of the present disclosure.
Figure 15B:
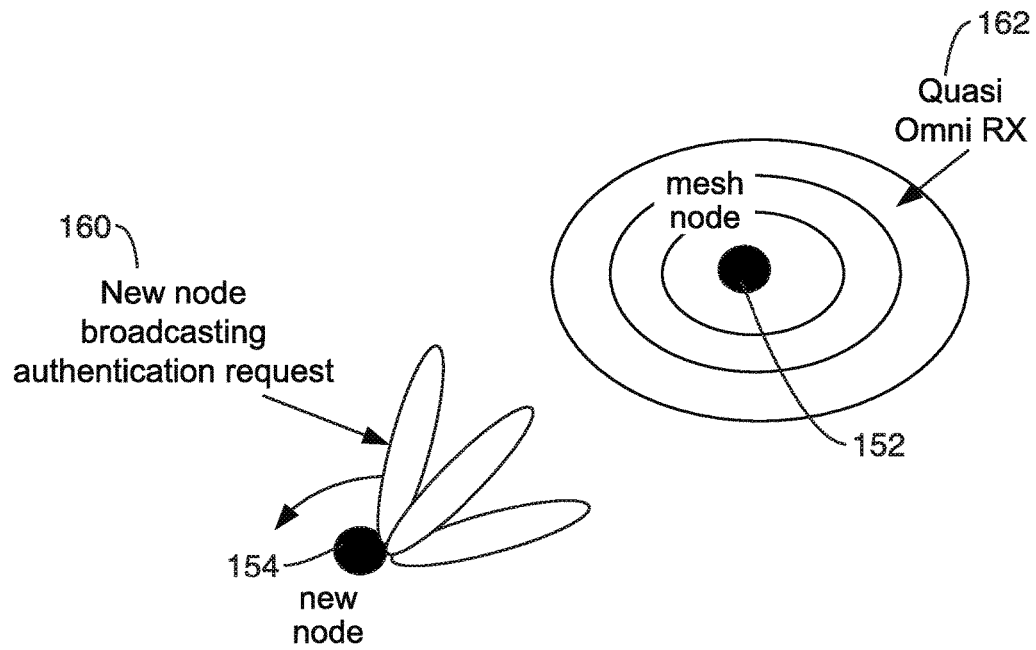

FIG. 15A through FIG. 15D illustrate an example embodiment 150 of authenticating without beamforming. In FIG. 15A a mesh node 152 transmits directional beacons and the new node 154 utilizes omni-antenna for reception. In FIG. 15B it is seen that the node broadcasts an authentication request 160 in all direction with the discovered neighbors IDs. The authentication request contains the best beacon ID received from the mesh nodes that need to be authenticated and the ID of the beam the new node is transmitting from. Mesh node 152 receives the authentication requests and their IDs matching the discovered node IDs in the received request.

Figure 15C:
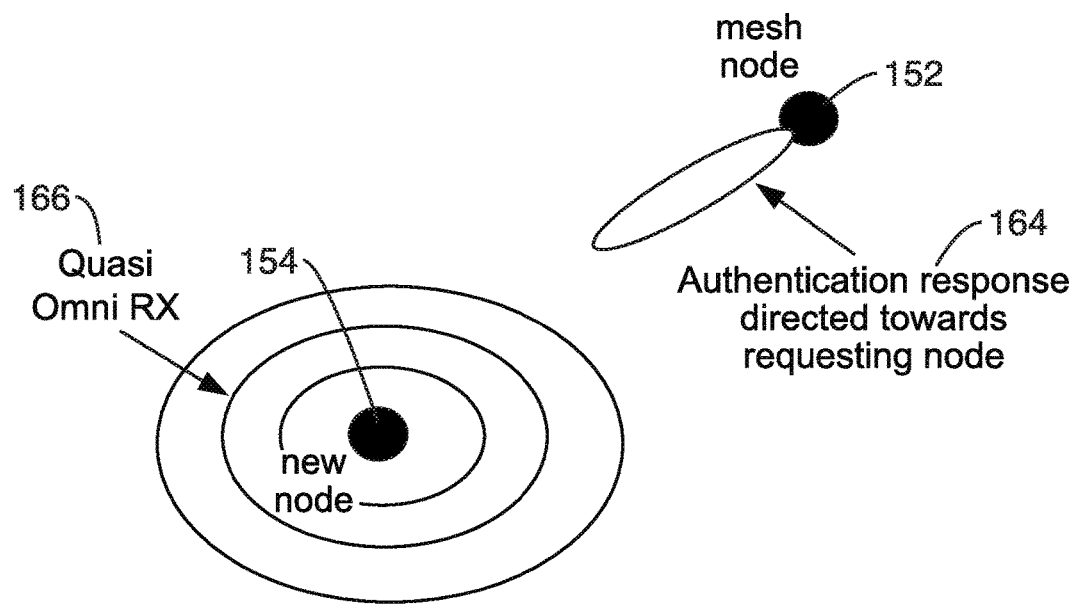

In FIG. 15C the mesh node responds by transmitting an authentication response 164 to be received 166 by new node 154. The transmission from the mesh node is seen utilizing a beam or beams directed toward the requesting node, since it knows its direction. The best beam ID of each mesh node is broadcasted associated with the mesh node ID in the authentication request message. Note that multiple mesh node IDs and their associated beam ID can be in the authentication request. Once a mesh node receives the authentication request, it will know what beacon was received at the new node requesting authenticating and can determine the beam for communication with this new neighbor node. The authentication response additionally carries the information required for performing the authentication procedure including the beam ID of the beam over which the node received the authentication request with the highest power.

Figure 15D:
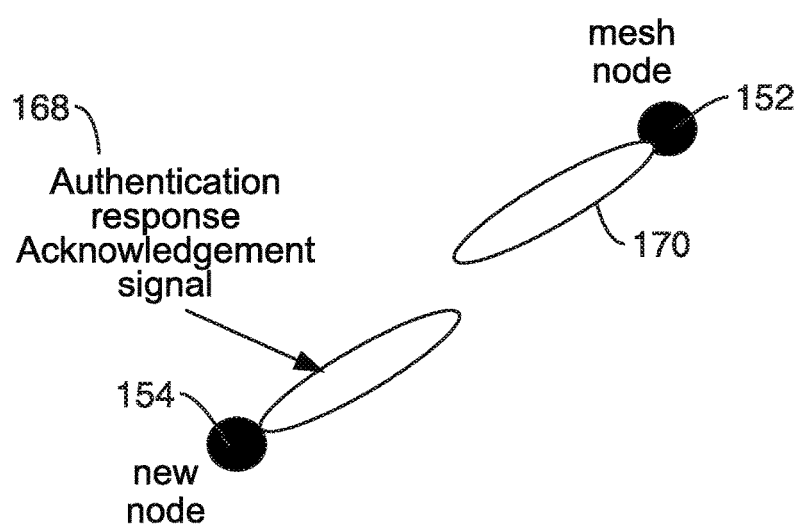

In FIG. 15D the new node, having received the authentication response know the best beam to communicate to the mesh node and utilizes that beam for transmitting (sending) the authentication ACK signal 168 which is directionally received 170 by the mesh node.

Figure 16A:
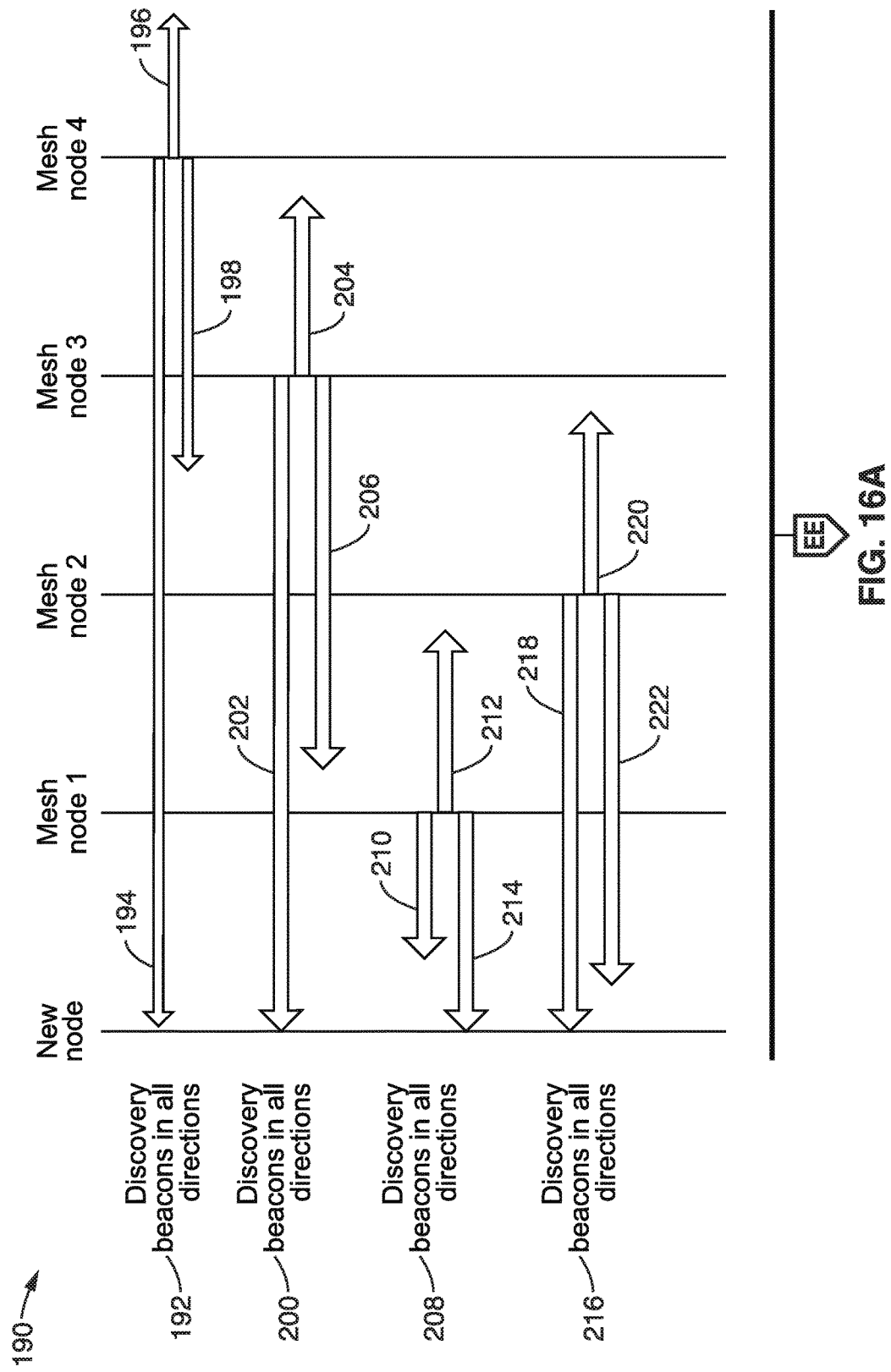

FIG. 16A and FIG. 16B illustrates an example embodiment 190 of a mesh node grouping all the discovered nodes and creating a list of mesh nodes to be authenticated. As seen in the figure, the new node collects information from all nodes to authenticate with and broadcasts the authentication request with all their IDs and beam IDs of best beacon received. In the figure it is seen that each node sends discovery beacons in all directions: from node 4 194, 196 and 198, from node 3 202, 204, 206, from node 1 210, 212, 214, and from node 2 218, 220, and 222. The new node is seen receiving these beacons 192, 200, 208 and 216, but has not yet responded.

In FIG. 16B it is seen that the new node sends authentication requests 224, shown as 226*a*-226*f* in all directions for receipt by the local nodes. Nodes receiving the authentication request use a channel access scheme to access the channel and send their authentication response once it's ready. The figure shows authentication response 230*a* from node 2, 232*a* from node 1, 234*a* from node 3, and 236*a* from node 4, which are received 228 by the new node, which responds directly to the authentication response by the authentication response feedback (ACK) seen as 230*b*, 232*b*, 234*b* and 236*b*. The new node keeps listening for more authentication responses and respond to them once it is received.

3.3.2. Authenticating after Beamforming

In this authentication mechanism, discovered nodes are informed about a new node through beamforming frames sent back to the node transmitting the beacons.

Figure 17:
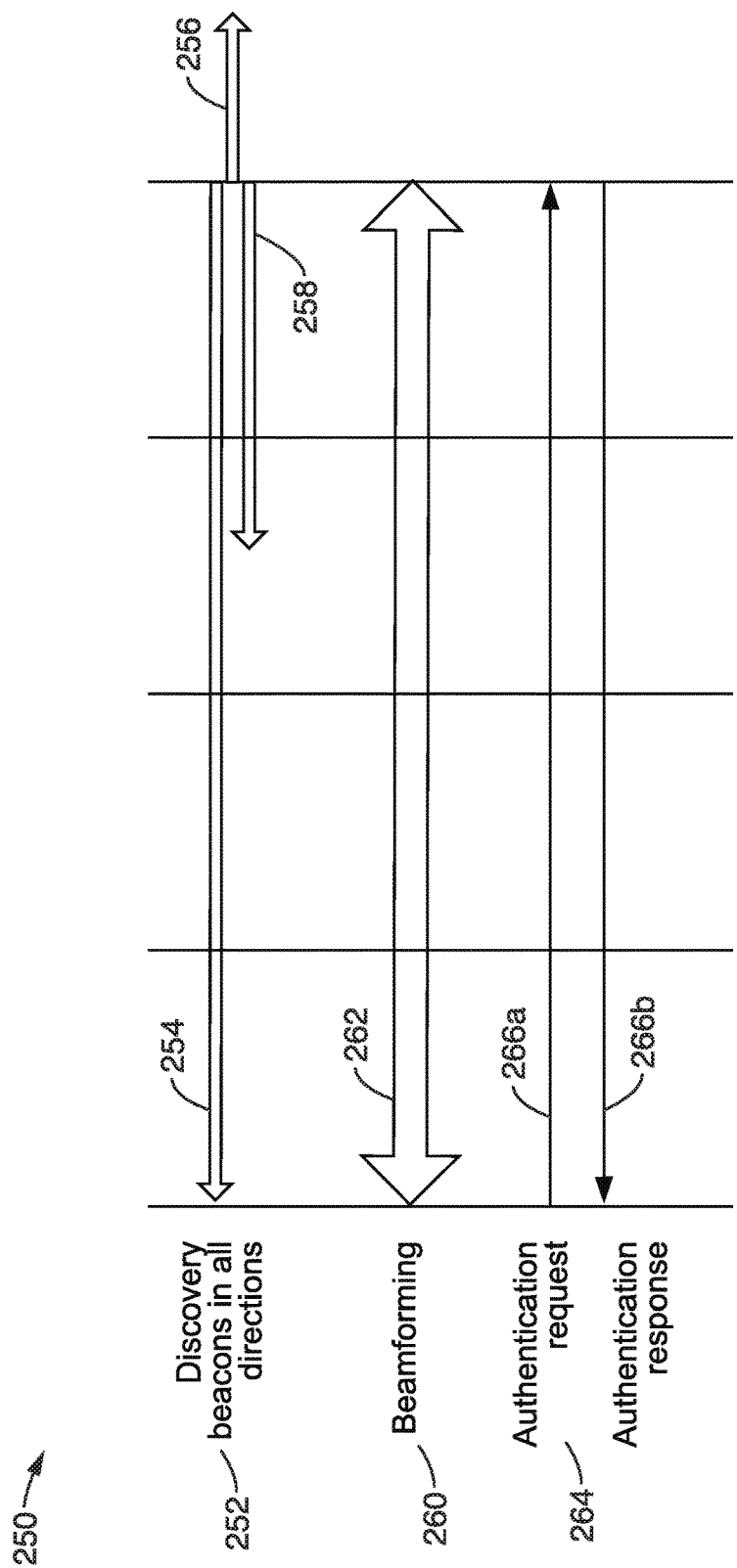
FIG. 17 is a message passing diagram of new node authentication through beamforming according to an embodiment of the present disclosure.

FIG. 17 illustrates an example embodiment 250 of authentication in which the new node and the discovered mesh node beam form their antennas upon the new node discovering the new neighbor. In the example figure, node 4 is seen transmitting discovery beacons in all directions 254, 256 and 258, as received 252 by the new node. Beamforming 260 is then performed between the mesh node transmitting the beacons 262 and the new node, followed by authentication 264 of the new node by it sending an authentication request 266*a*, which node 4 responds to with an authentication response 266*b*.

Thus, after beamforming is successful, the new node starts the authentication procedure by transmitting an authentication request message and waiting for the authentication response. A coarse beamforming is exemplified which should be sufficient, although fine beam forming may be utilized between the two nodes. Once the authentication response is received the new node sends an authentication response ACK to the mesh node.

3.4. On-Demand BF, Synchronization and Route Assignment

Regular traffic routes should be initialized and maintained whenever traffic is initiated from one source node to a destination node. Backup routes might be prepared as well to avoid delay in case link interruption occurs. Backup routes should be initialized, beamformed and synchronized for future use.

3.4.1. Route Initiation

Figure 18A:
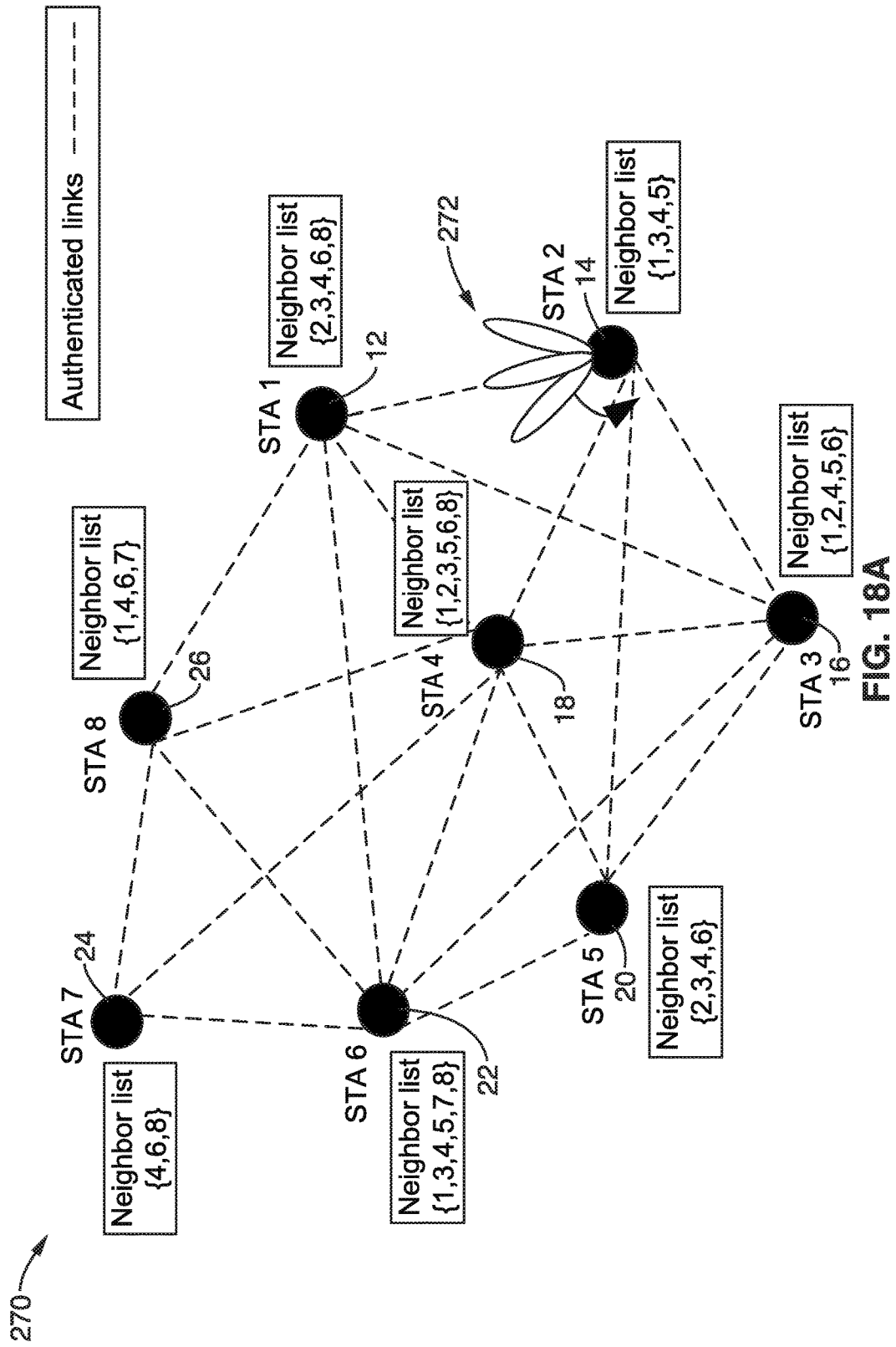
FIG. 18A through FIG. 18C are node topology diagrams showing route request broadcasting according to an embodiment of the present disclosure.
Figure 18B:
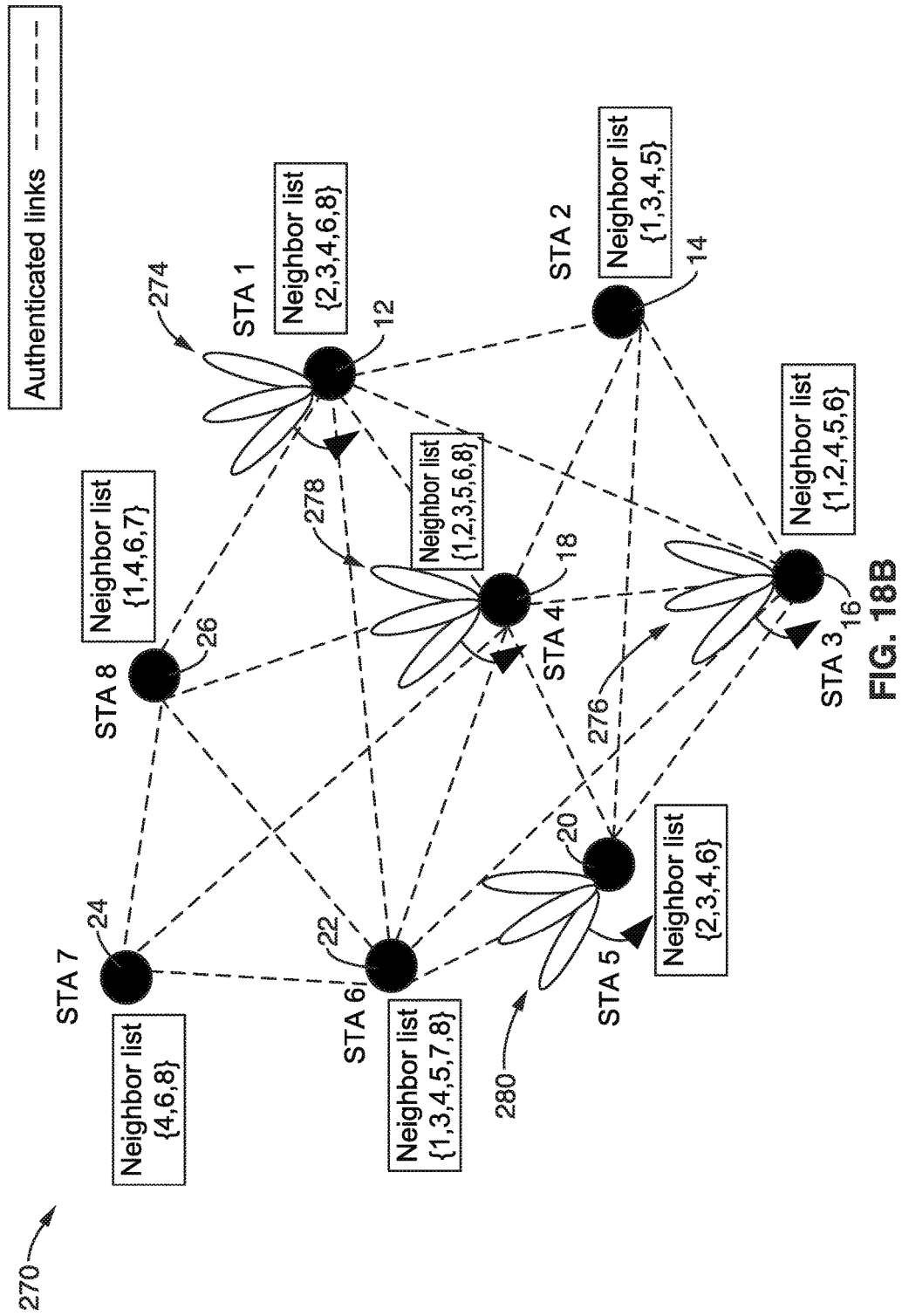
Figure 18C:
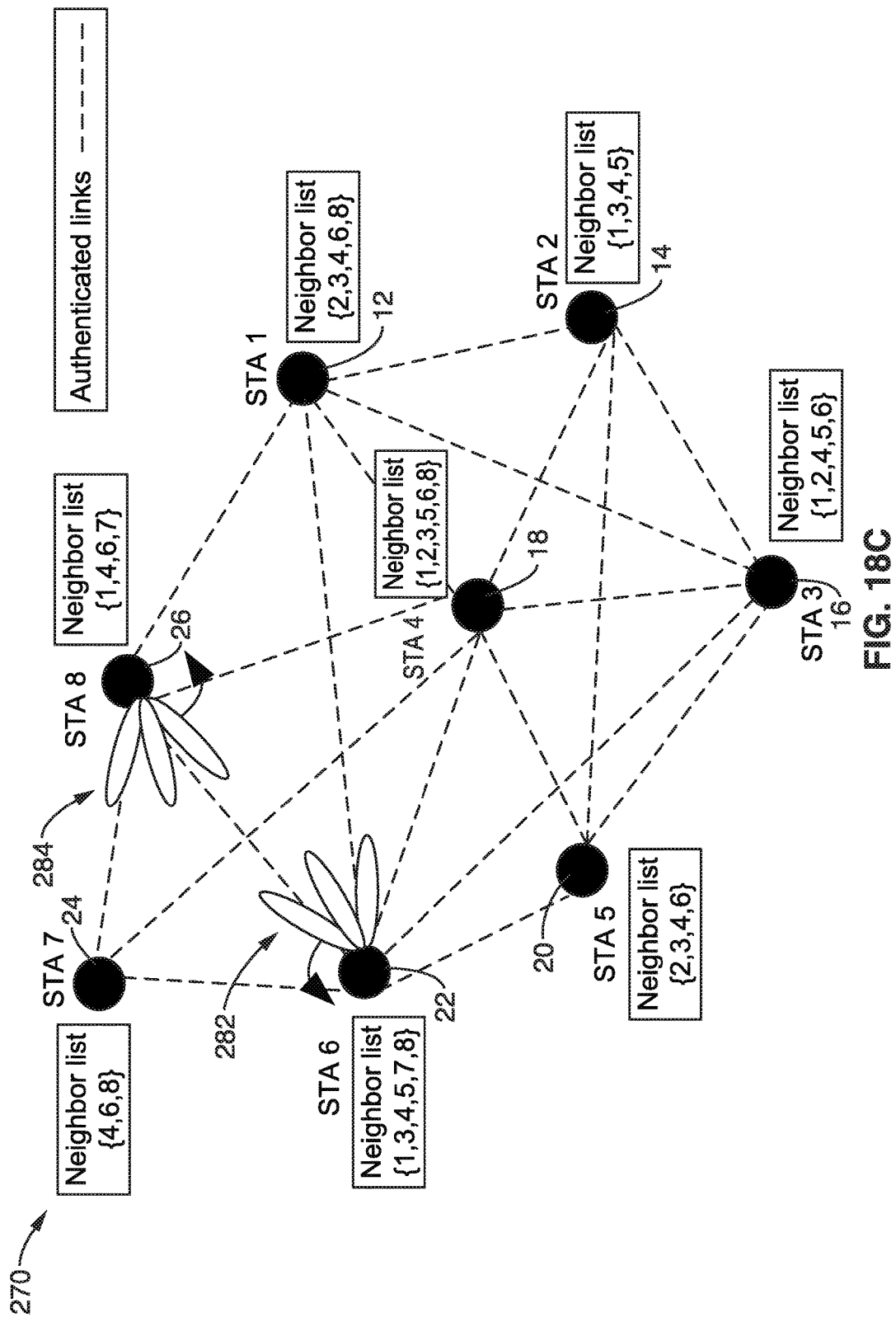

FIG. 18A through FIG. 18C illustrate an example embodiment 270 of initiating route request propagation. In these figures are shown an example of local nodes STA 1 12, STA 2 14, STA 3 16, STA 4 18, STA 5 20, STA 6 22, STA 7 24, STA 8 26, with authenticated links seen in the dashed lines between the nodes and an example neighbor list shown for each node.

Following describes the operation of this route request propagation. (a) An application triggers the node to find a route to a destination mesh node. It will be noted that this application represents any application that generates traffic intended to be transferred to another node in the network. This can be through a computer attached to the wireless node or through an application running on the node itself. (b) This node can be a gateway mesh node to reach out to an external server or another mesh node for peer-to-peer communication. (c) Nodes at that time are authenticated with a list of neighbors and store information of the strongest beacon beam ID for each of these neighbors. However, this information might not be up-to-date. (d) In FIG. 18A Node 2 14 transmits a Route Request (RREQ) 272 in all directions to start a data session (e) The RREQ contains the list of nodes to be reached, their best beacon beam ID and other information needed for routing. (f) Once a node receive this frame, it checks if this is coming from an authenticated nodes. If the frame is coming from an authenticated node, the mesh node checks if it is directed to itself. This can be performed by checking the IDs of the RREQ frame intended neighbors. (g) If the node in the list, it forwards this frame to all its neighbor except the source, as seen in FIG. 18B with node 1 transmitting RREQ 274, node 3 transmitting RREQ 276, node 4 transmitting RREQ 278, node 5 transmitting RREQ 280, toward the destination. (h) Nodes receive this RREQ broadcast to other nodes in all directions. A channel access scheme is used to avoid frame collision. (i)

The broadcasting of the RREQ continues, as seen in FIG. 18C, with STA 6 RREQ transmission 282, and STA 8 RREQ transmission 284, until the RREQ frame is propagated throughout the network and terminated at the destination node, node 7 24.

Figure 19A:
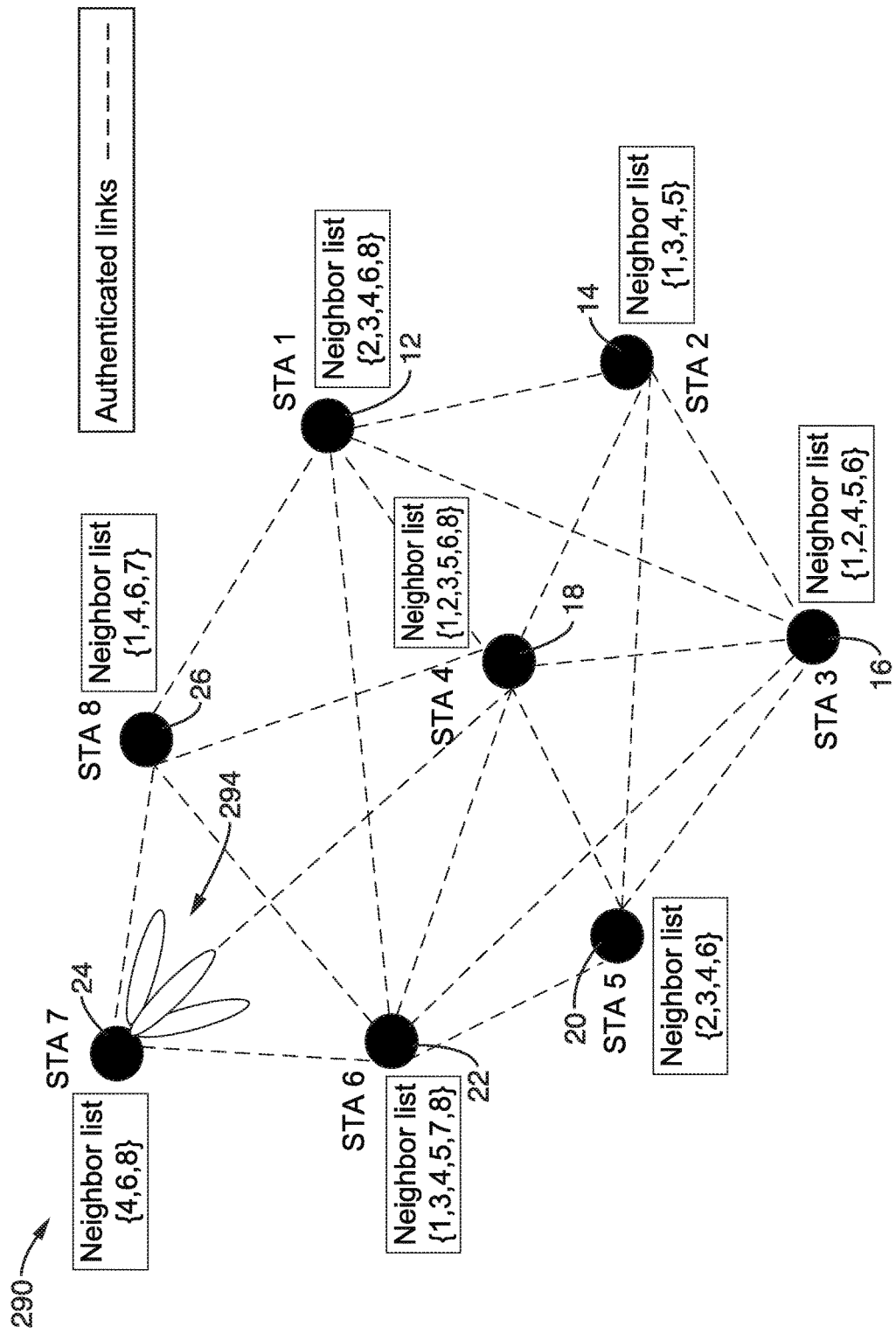
Figure 19B:
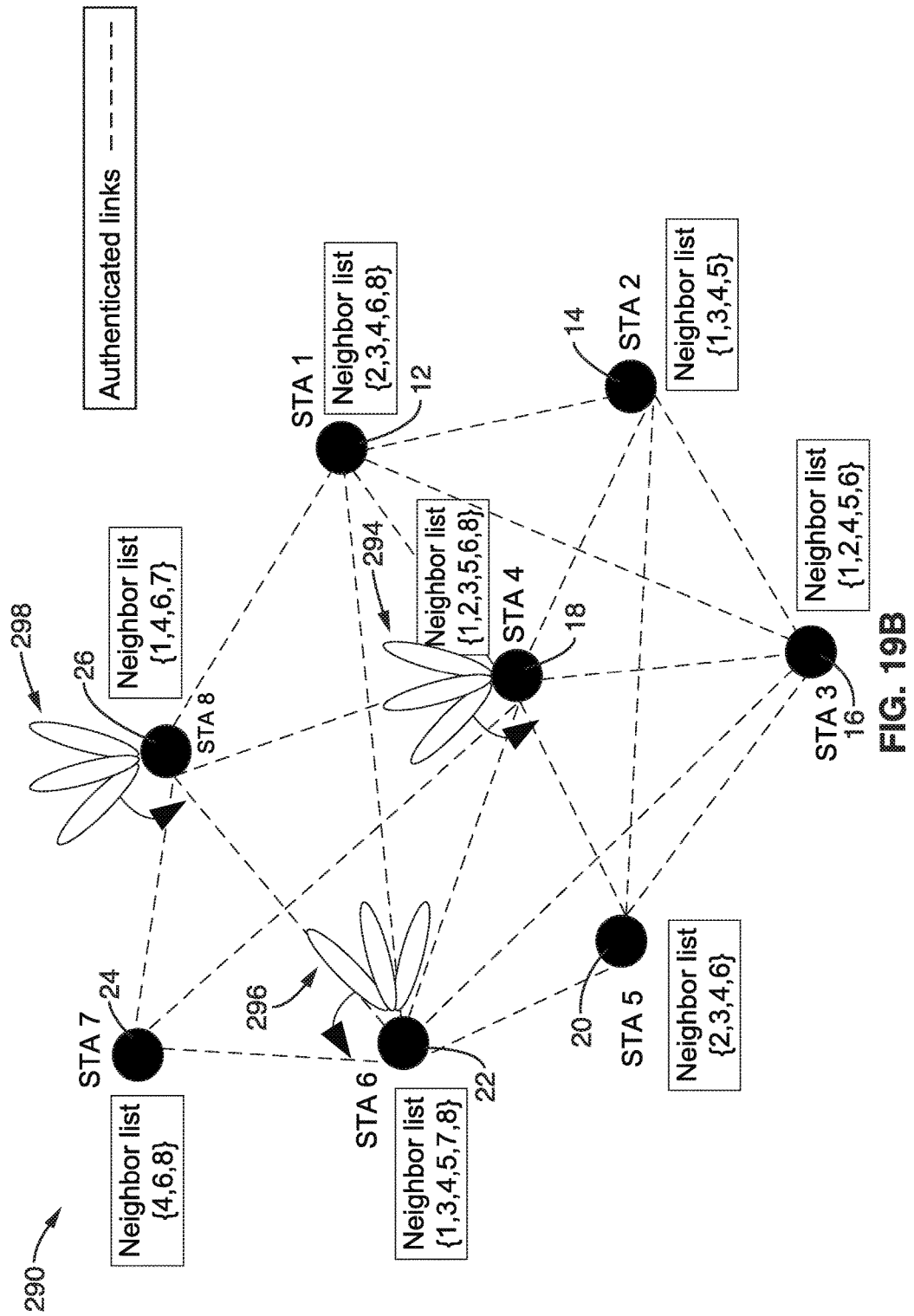

FIG. 19A through FIG. 19C illustrate an example embodiment 290 of route request propagation. By way of example local nodes STA 1 12, STA 2 14, STA 3 16, STA 4 18, STA 5 20, STA 6 22, STA 7 24, STA 8 26, are shown with authenticated links seen in the dashed lines and an example neighbor list shown for each node.

The following are features of route response propagation broadcasting. (a) Once the destination node, in this case node 7 24, receives all RREQs, it prepares the RRES frame. (b) Destination node broadcasts 292 this RRES to the initiator source in all directions, as seen in FIG. 19A. (c) In at least one embodiment, the RRES message has a field to list all nodes intended to receive this RRES. (d) Once a node receives this frame(s), it checks if it (these) are coming from an authenticated node(s). If the frame(s) is coming from an authenticated frame, the mesh node checks if it is directed to this node. In at least one embodiment, this is performed by checking the IDs of the RRES frame intended neighbors. (e) If the mesh node is in the list of nodes listed in the RRES frame, it forwards this frame to all its neighbor except the source as seen in FIG. 19B with STA 4 transmitting RRES 294, STA 6 transmitting RRES 296, and STA 8 transmitting RRES 298. (f) The RRES contains the list of nodes to be reached and their best beacon beam ID as well as other information needed for routing. (g) The broadcasting of the RRES continues, as seen in FIG. 19C, with STA 1 transmitting RRES 300, STA 3 transmitting RRES 302, and STA 5 transmitting RRES 304, until the RRES frame is propagated throughout the network and terminated at the initiator node, which in this case is node 2 (STA 2) 14.

Figure 20A:
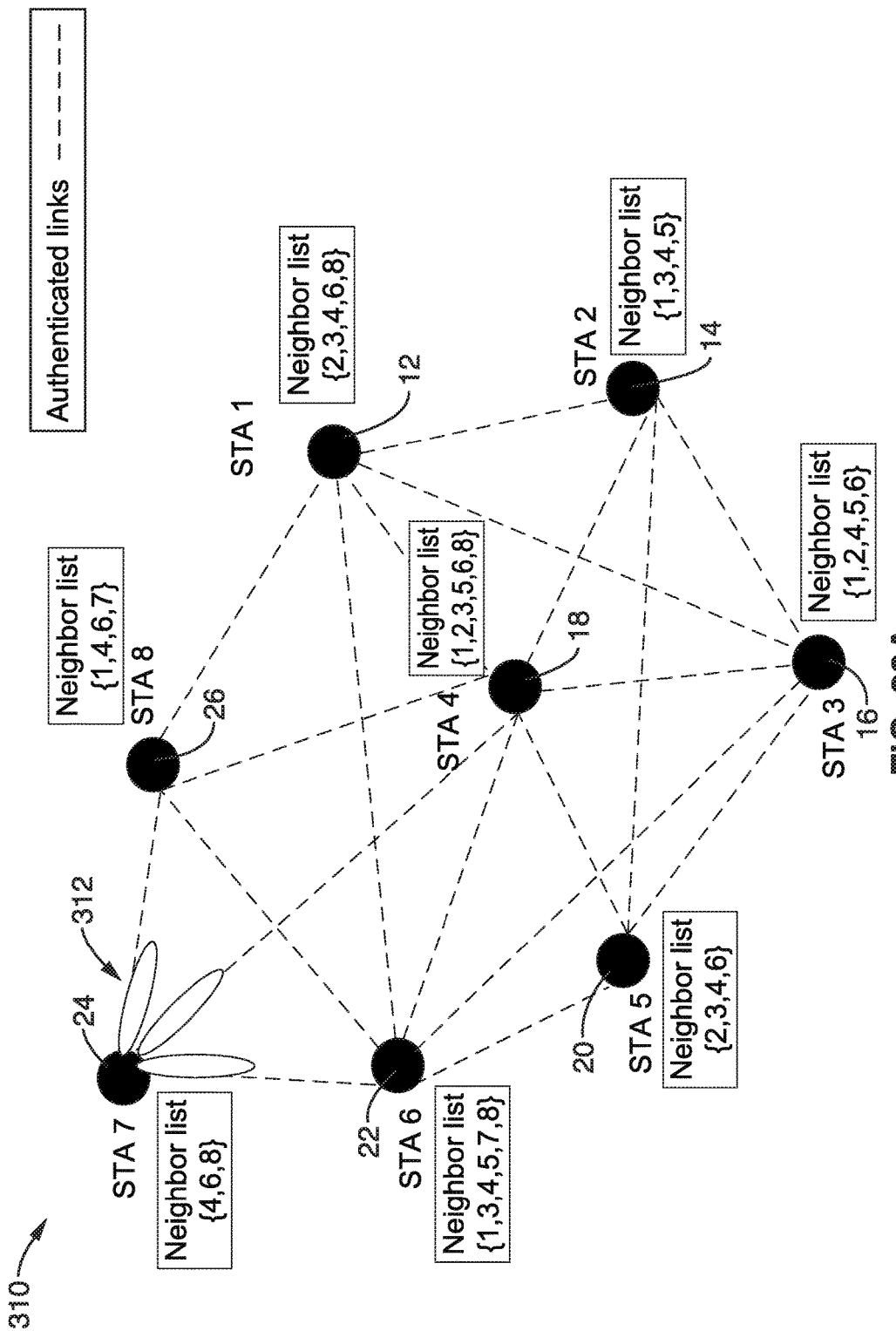
FIG. 20A through FIG. 20C are node topology diagrams showing route response propagation through broadcasting according to an embodiment of the present disclosure.
Figure 20B:
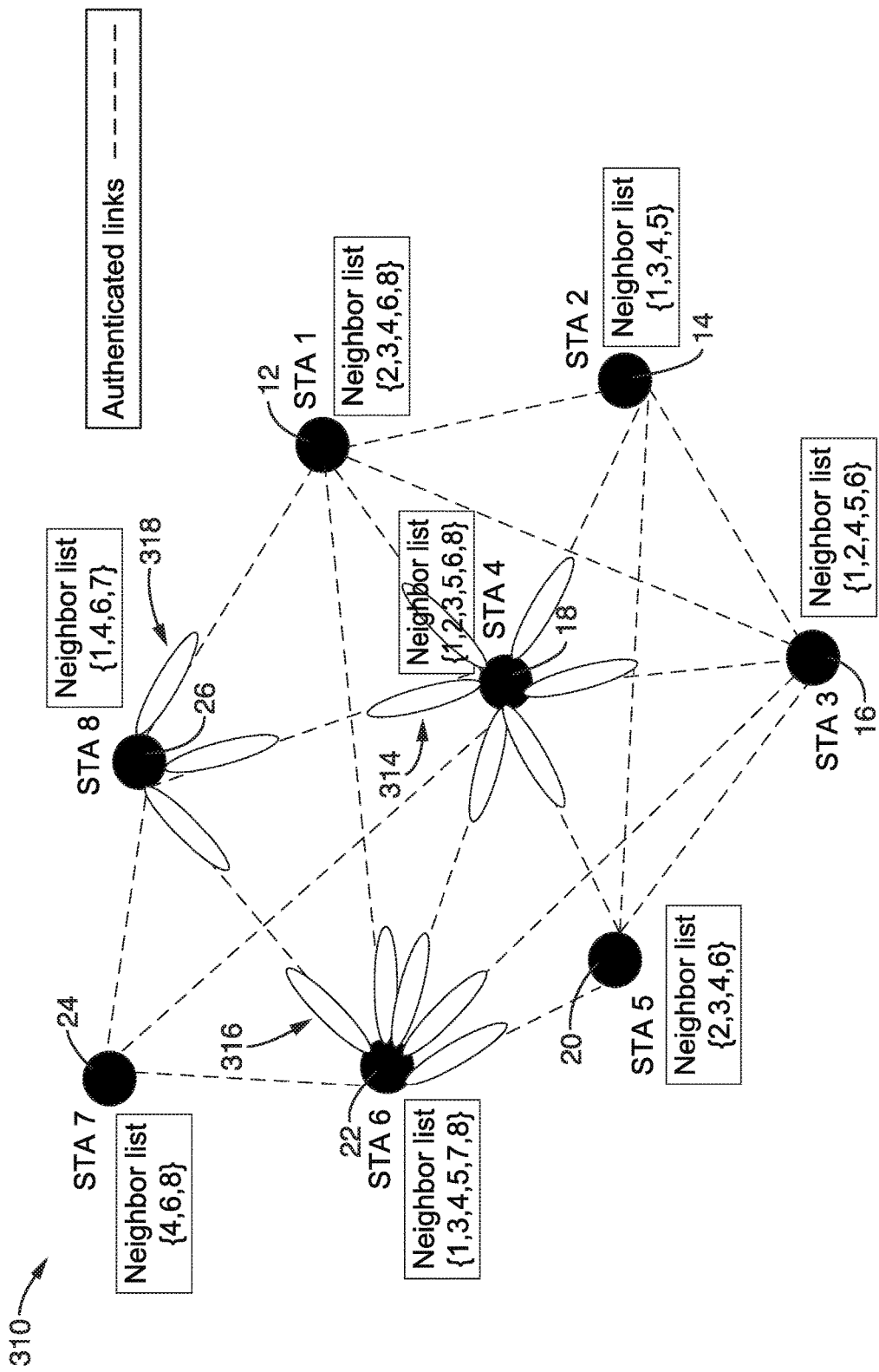
Figure 20C:
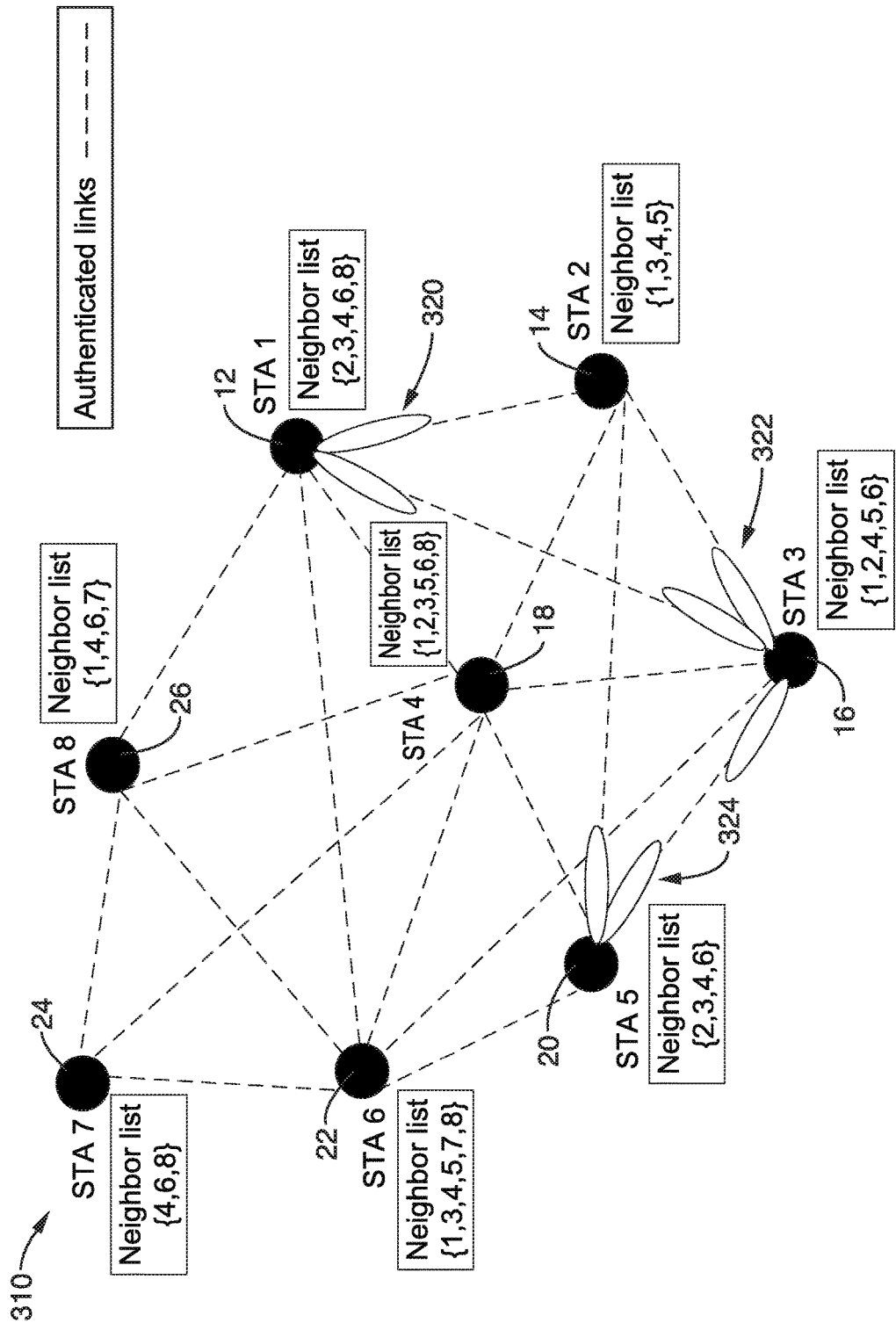

FIG. 20A through FIG. 20C illustrate an example embodiment 310 of route request propagation in which RRES is being sent out. By way of example, local nodes STA 1 12, STA 2 14, STA 3 16, STA 4 18, STA 5 20, STA 6 22, STA 7 24, STA 8 26, are shown with authenticated links seen in the dashed lines and an example neighbor list shown for each node, and in these figures show an example of route response beamforming. (a) The mesh nodes are aware of the best beacon beam ID of their authenticated neighbors through the reception of their beacons. Continuous transmission of beacons towards neighbors is assumed. (b) The mesh nodes feedback this information. (c) Once a neighbor receives the RREQ, it extracts information on the best beam to communicate with its authenticated neighbor from which it received the RREQ. (d) The neighbor can use this information to send the RRES as shown in FIG. 20A showing an RRES sent 312 from STA 7 24. (e) The neighbors then send the RREQ using directive beam as seen in FIG. 20B to their authenticated neighbors through the RREQ frame, the figure showing STA 4 18 transmitting RRES 314, STA 6 22 transmitting RRES 316, and STA 8 26 transmitting RRES 318. The ID of the beam matches the ID it got from the RREQ broadcasted frame. (f) The neighbor adds the best beam ID of the node from which it received the RREQ to the RRES frame. Similarly, in FIG. 20C nodes STA 1 12 transmitting RRES 320, STA 3 16 transmitting RRES 322, and STA 5 20 transmitting RRES 324. This information is available at the RREQ frame received from the mesh node where each RREQ contains the beam ID it is transmitted from.

3.4.2. Route Beamforming

Figure 21A:
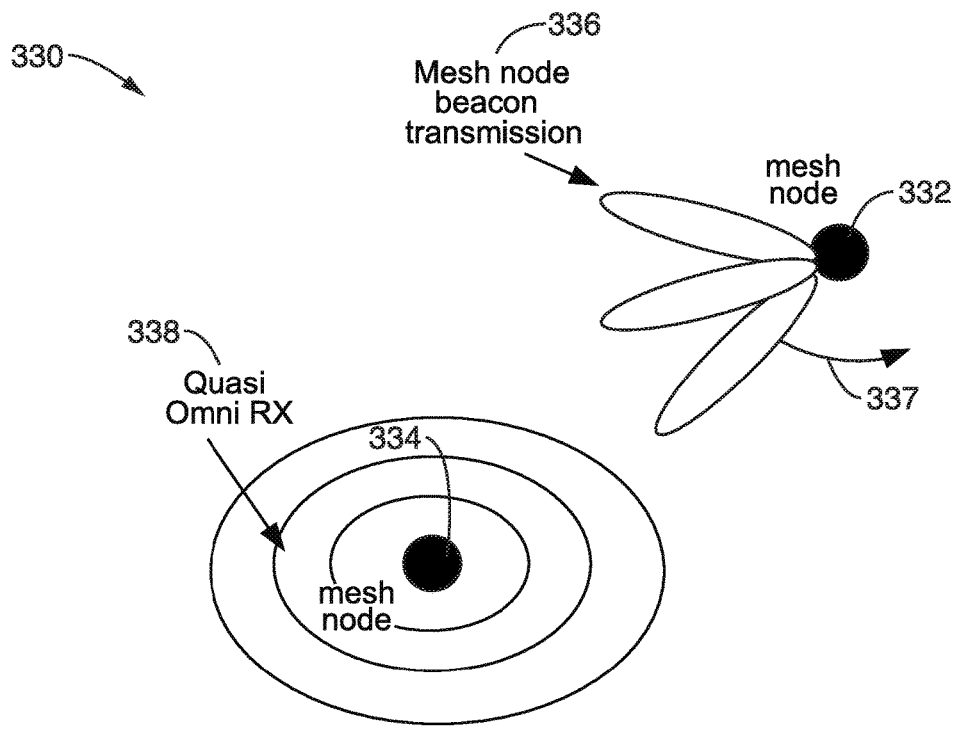
FIG. 21A through FIG. 21C are node topology diagrams showing beamforming using beacons RREQ and RRES, according to an embodiment of the present disclosure.
Figure 21B:
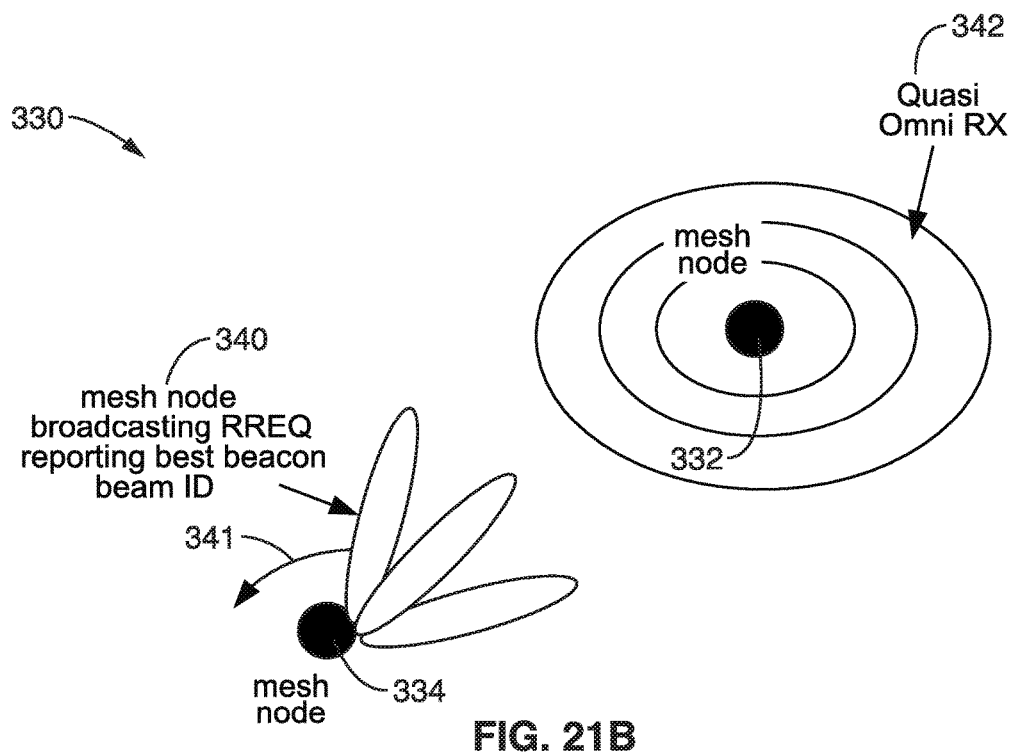
Figure 21C:
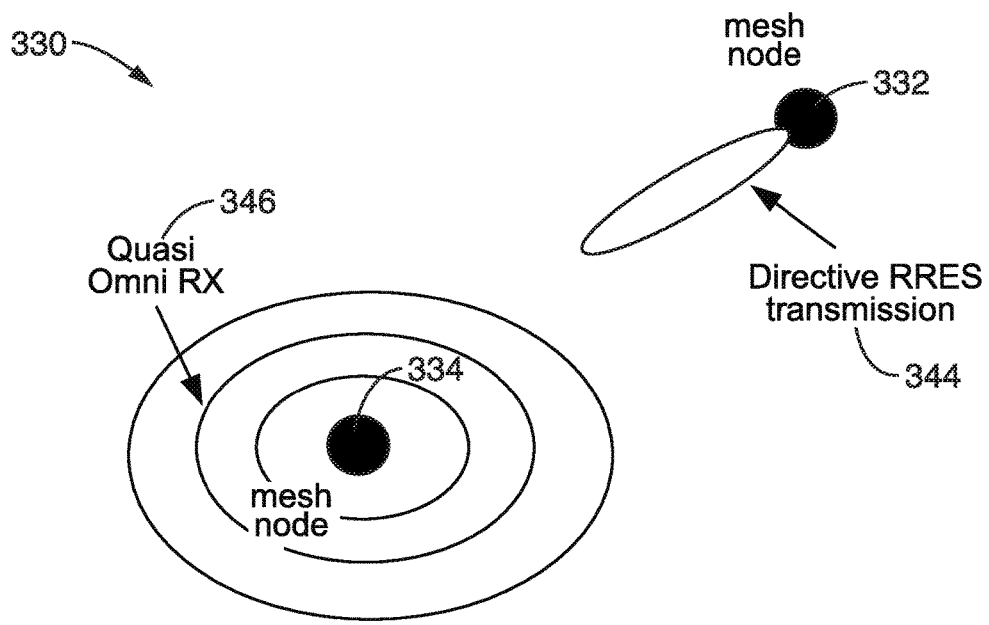

FIG. 21A through FIG. 21C illustrate an example embodiment 330 of route beamforming. The following are attributes of route beamforming according to the present disclosure. (a) Beamforming is triggered by the route set up. (b) Whether the RRES is broadcasted or beam formed, at the end of the RREQ and RRES exchange process, nodes throughout the route have beamformed their link toward each other. (c) Throughout the route setup links are beamformed. The links that will be in the permanent route table will be maintained through the traditional beamforming processes, the links that are not in the selected route can maintain information about the beamforming information for future faster beamforming. (d) The beacon transmission sweeping can be used in addition to the RREQ and RRES frames to complete the sector sweeping as shown in FIG. 21A through FIG. 21C.

In FIG. 21A a mesh node 332 transmits beacons 336 in all directions 337, to be received by mesh node 334 using quasi-omni receiving 338. In FIG. 21B mesh node 334 then broadcasts RREQ 334 in all directions 341 to be received by mesh node 332 in quasi-omni receiving 342, then in response mesh node 332 sends directive transmission 344 to mesh node 334 which is received by quasi-omni receiving 346.

Figure 22A:
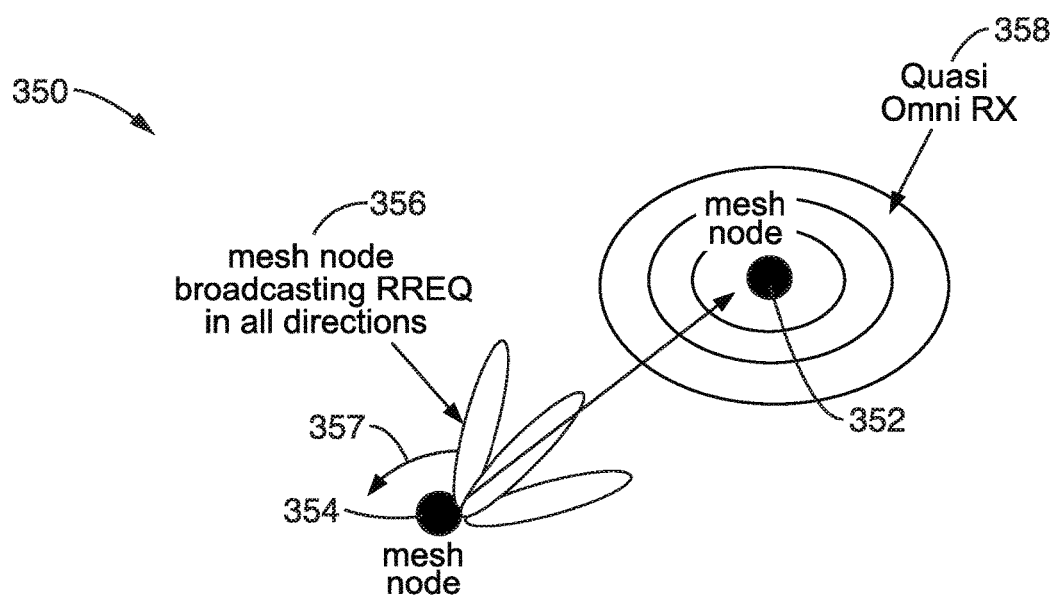
FIG. 22A through FIG. 22C are node topology diagrams showing beamforming using beacons RREQ, RRES and RRES feedback, according to an embodiment of the present disclosure.
Figure 22B:
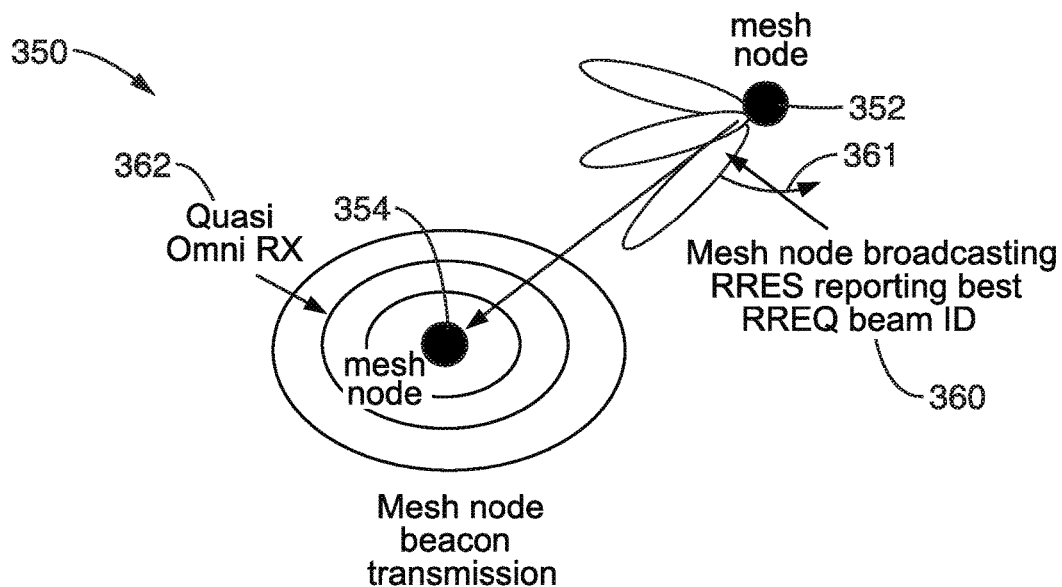
Figure 22C:
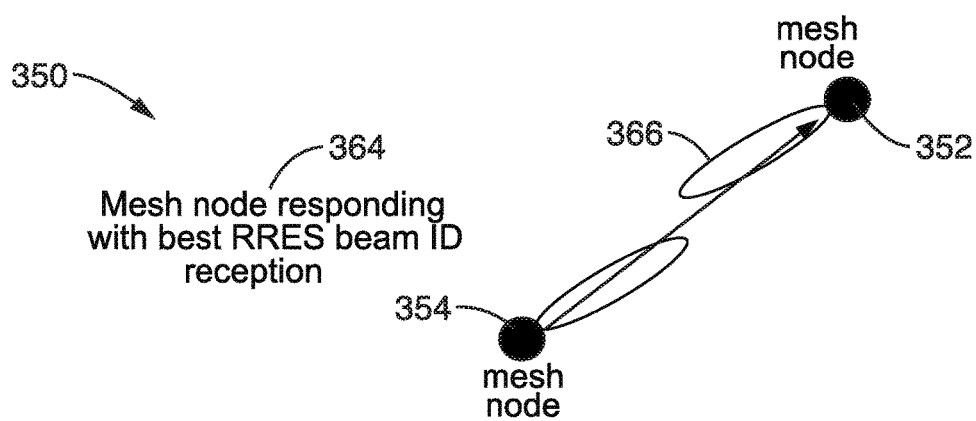

FIG. 22A through FIG. 22C illustrate an example embodiment 350 of route beamforming using beacons RREQ and RRES. If the beacons best beam information is not reliable, for example RREQ and RRES signals being transmitted long after the beacon reception. Then beamforming can rely only on the exchange of the RREQ and RRES signals. A third frame should be transmitted after the reception of the RRES to feedback the best beam from which the RRES is received as shown in the figures. In FIG. 22A mesh node 354 performs mesh node broadcasting 356 in a sweep 357 to be received for example by mesh node 352 in quasi-omni reception 358. In FIG. 22B mesh node 352 then broadcasts 360 in directions 361 which is received by node 354 by quasi-omni reception 362, followed by mesh node 354 responding in FIG. 22C with directed transmission 364 to mesh node 352 performing directional reception 366.

3.4.3. Synchronization

Once an active route, and in some cases a backup route, are formed, a synchronization signal is sent and propagated through the assigned end-to-end routes. By default, the initiator node is the clock master in this route and it sends the first synchronization signal unless special circumstances arise, such as exemplified by the initiator allowing another mesh node in the selected route to be the clock master (synchronization master). For example, if one or more mesh nodes in the selected route have a special status and request to be a master clock, this information can be forwarded to the initiator through the RRES and the initiator selects the node that will be the clock master. A frame will be sent to the mesh node selected by the initiator to serve as master clock.

The first synchronization signal is a frame sent from the initiator mesh node or the selected mesh node and propagates through the active and the backup route if it exists. In order to maintain the synchronization, beacons throughout the route can carry synchronization information. Only beacons in the direction of the active route carries the synchronization signal to the beamformed neighbors in the assigned routes. The beacon synchronization signal can also be sent through other beams neighboring the selected beamformed beam. This is to add some reliability to the link in case beam switching happened to a nearby beam.

Figure 23A:
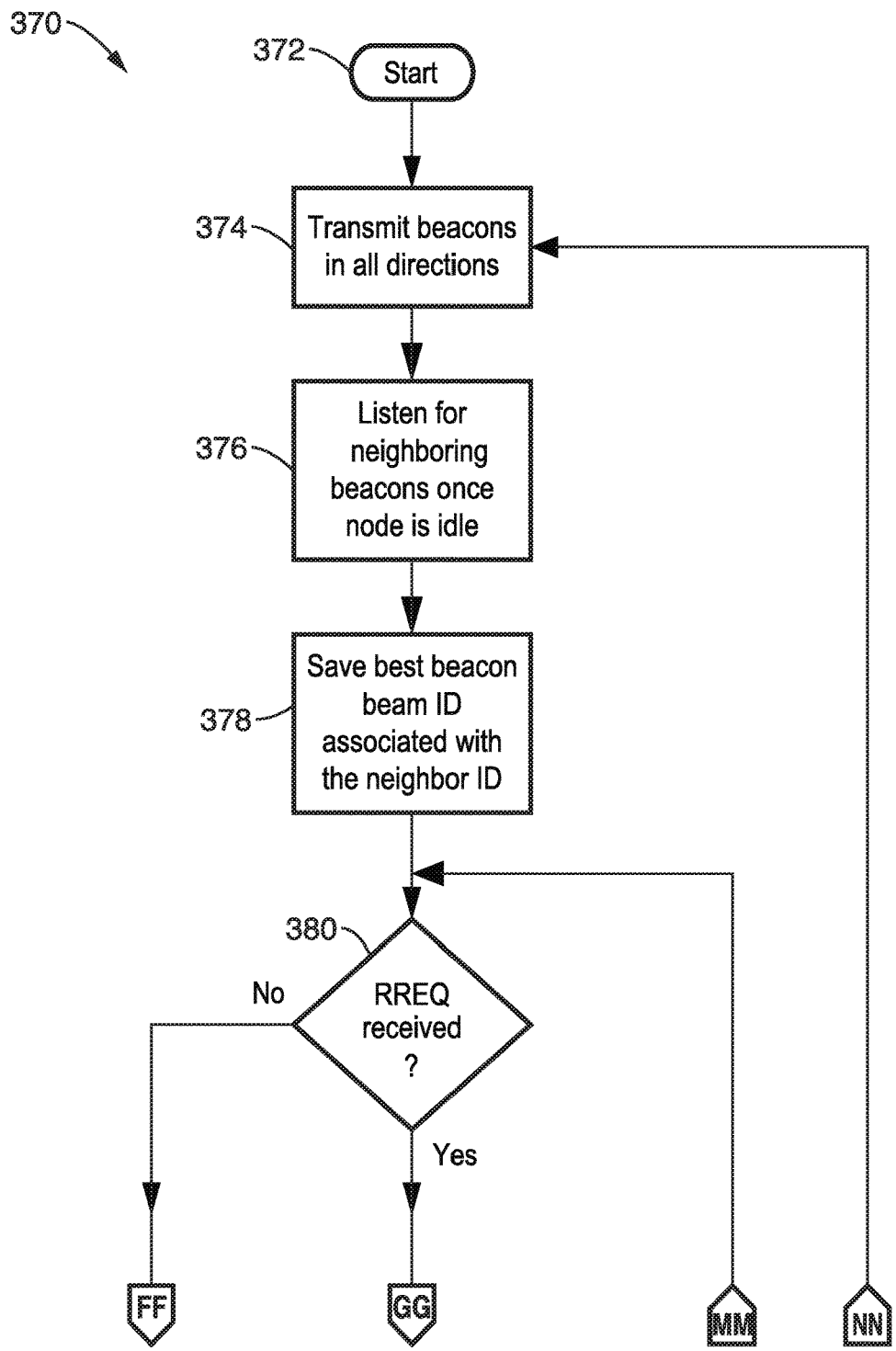
FIG. 23A through FIG. 23D is a flow diagram of demand routing, beamforming and synchronization according to an embodiment of the present disclosure.

FIG. 23A through FIG. 24D illustrate an example embodiment 370 of a mesh node handling RREQ, RRES, beamforming, and synchronization management. In FIG. 23A the process starts 372 followed by the node transmitting 374 beacons in all directions. The node then listens 376 for neighboring beacons once the node is idle. The best beacon beam ID associated with each neighbor ID is then saved 378. A check is made 380 for RREQ being received. If an RREQ is received then execution moves to block 382 in FIG. 23B checking if the RREQ is from an authenticated node. If the RREQ is from an authenticated node, then in block 384 the best beam ID is extracted from the communication for that neighbor and the best beam information for that neighbor is updated. A check is then made 386 if the mesh node is the final destination node. If it is the final destination node, then in block 388 an RRES is sent to all neighbors using directive beams if beamforming data is available, and execution moves to block 412 in FIG. 23D. Otherwise if it is determined at block 386, that the mesh node is not the final destination, then at block 390 the RREQ is forwarded to all neighbors except the source of the RREQ, and execution moves to block 412 in FIG. 23D.

Figure 23B:
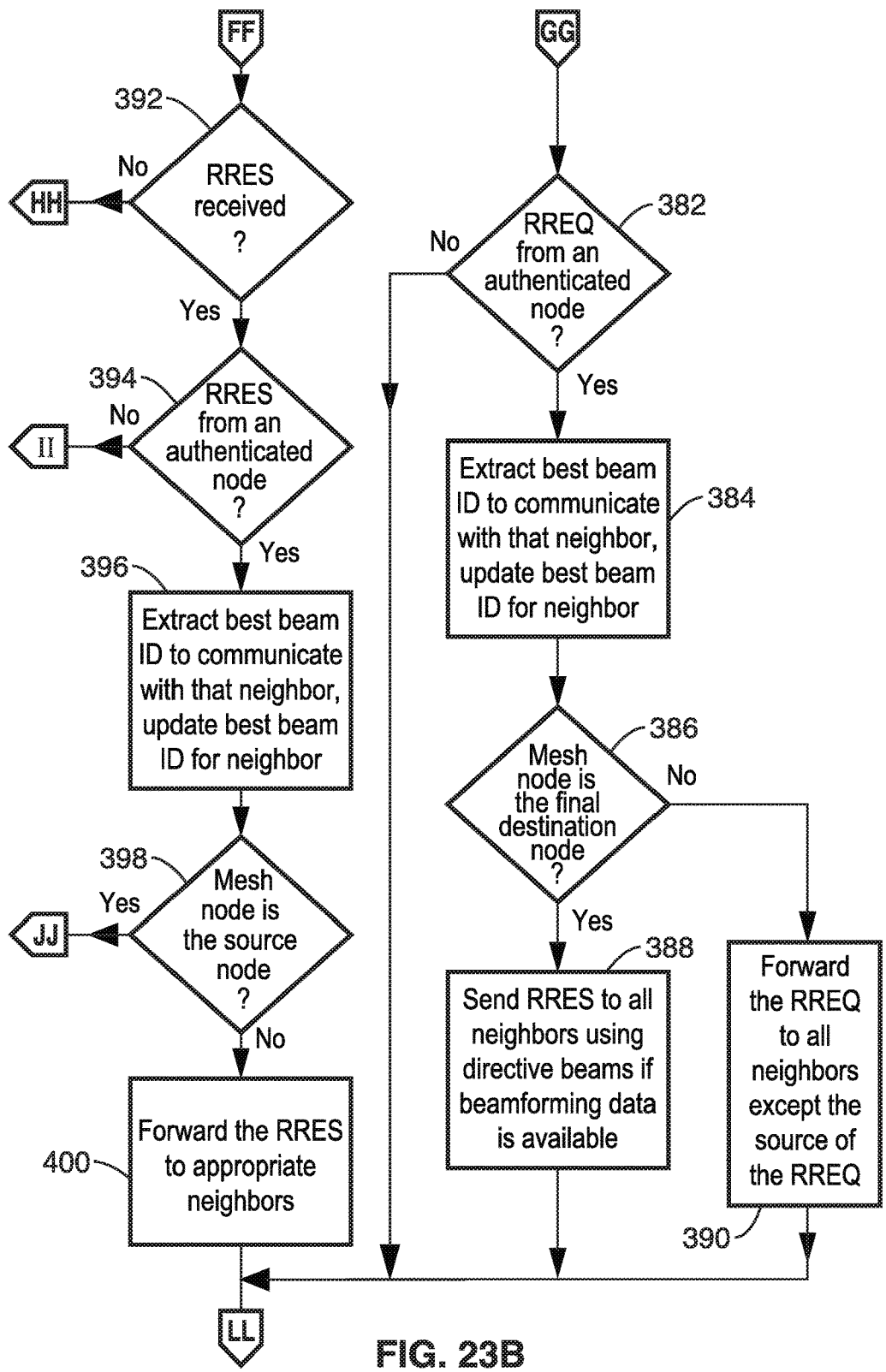
Figure 23C:
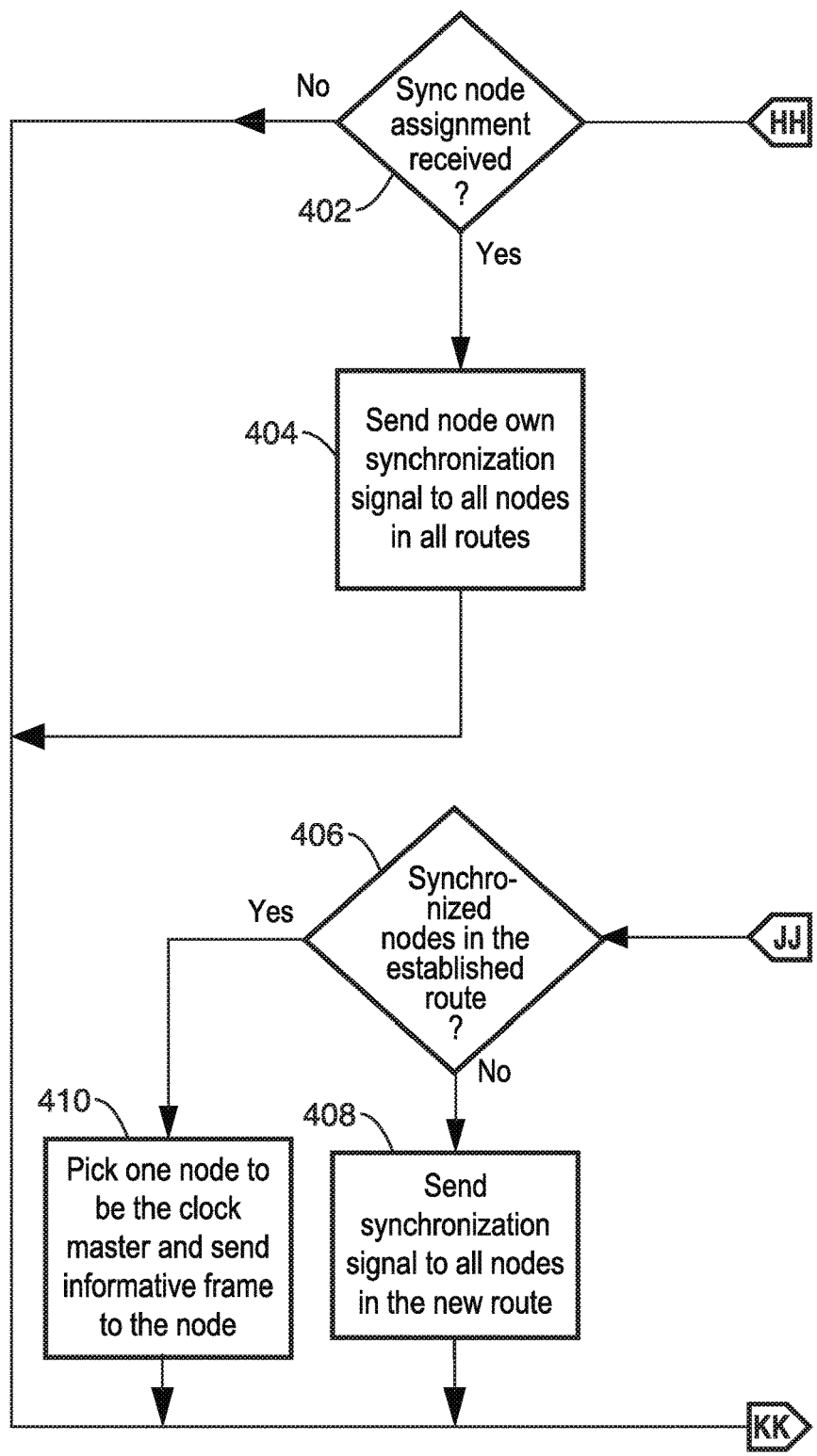

Returning now to block 380 in FIG. 23A, if an RREQ is not received then execution reaches check 392 in FIG. 23B which determines if an RRES was received. If an RRES was not received, then execution moves to block 402 in FIG. 23C to check for receipt of synchronization node assignment. If this synch node assignment was received, then the nodes own synchronization signal is sent 404 to all nodes in all routes. Then in either case execution reaches block 412 in FIG. 23D. Returning to block 392 in FIG. 23B, if an RRES was received, then a check 394 determines if the RRES is from an authenticated node. If the RRES is not from an authenticated node, then execution moves to block 412 in FIG. 23D. Otherwise a best beam is determined 396 from the communication of the authenticated RRES to update the best beam ID for this neighbor, and a determination made 398 if the mesh node is the source node. If it is determined to be the source node, then execution moves to block 406 in FIG. 23C, which checks if the synchronized nodes are in an established route. If they are in an established route, then in block 410 one node is picked to be the clock master and an informative frame is sent to that node, otherwise in block 408 a synchronization signal is sent to all nodes in the new route. Then in either case execution reaches block 412 in FIG. 23D. If as determined in block 398 that the mesh node is not the source node, then the RRES is forwarded 400 to the appropriate neighbors and execution reaches block 412 in FIG. 23D.

Figure 23D:
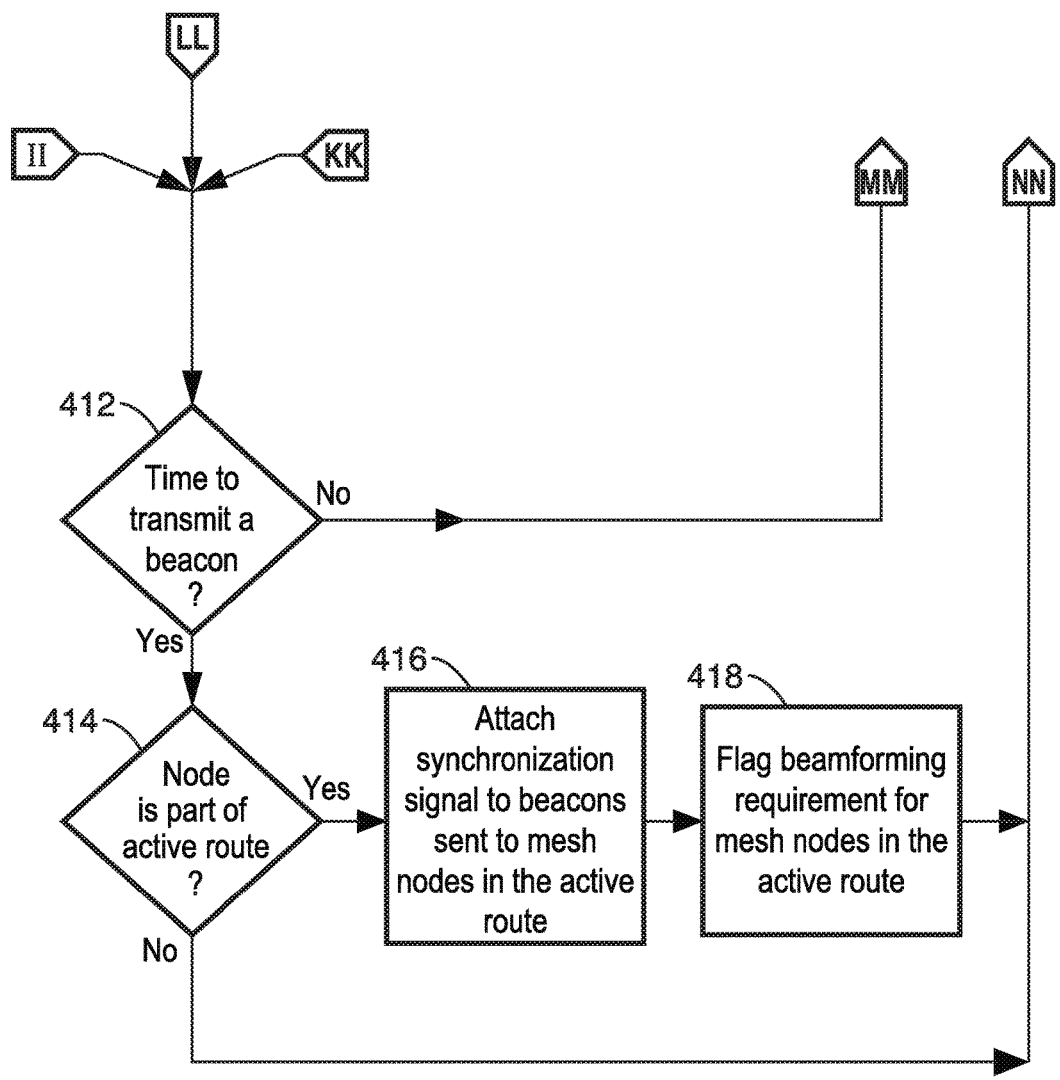

Then in this case block 412 in FIG. 23D is reached with a determination being made if it is time to transmit a beacon. If not time to transmit a beacon, then execution returns to block 380 in FIG. 23A. Otherwise, if it is time to transmit a beacon, then block 414 is reached which performs a check if the node is part of the active route. If it is not part of the active route, then execution returns to block 374 in FIG. 23A. Otherwise if the node is part of the active route, then in block 416 a synchronization signal is attached to beacons sent to mesh nodes in the active route, followed by a flag beamforming requirement for mesh nodes in the active route, prior to execution reaching block 374 in FIG. 23A. It will be appreciated that a beamforming requirement exists since only nodes in the active route (route where data is transmitted) are beamformed, the beacon sent to a node in the active route carries a beamforming requirement flag to say that this node should maintain the beamformed link.

3.5. Multiple-Route Management

Figure 24:
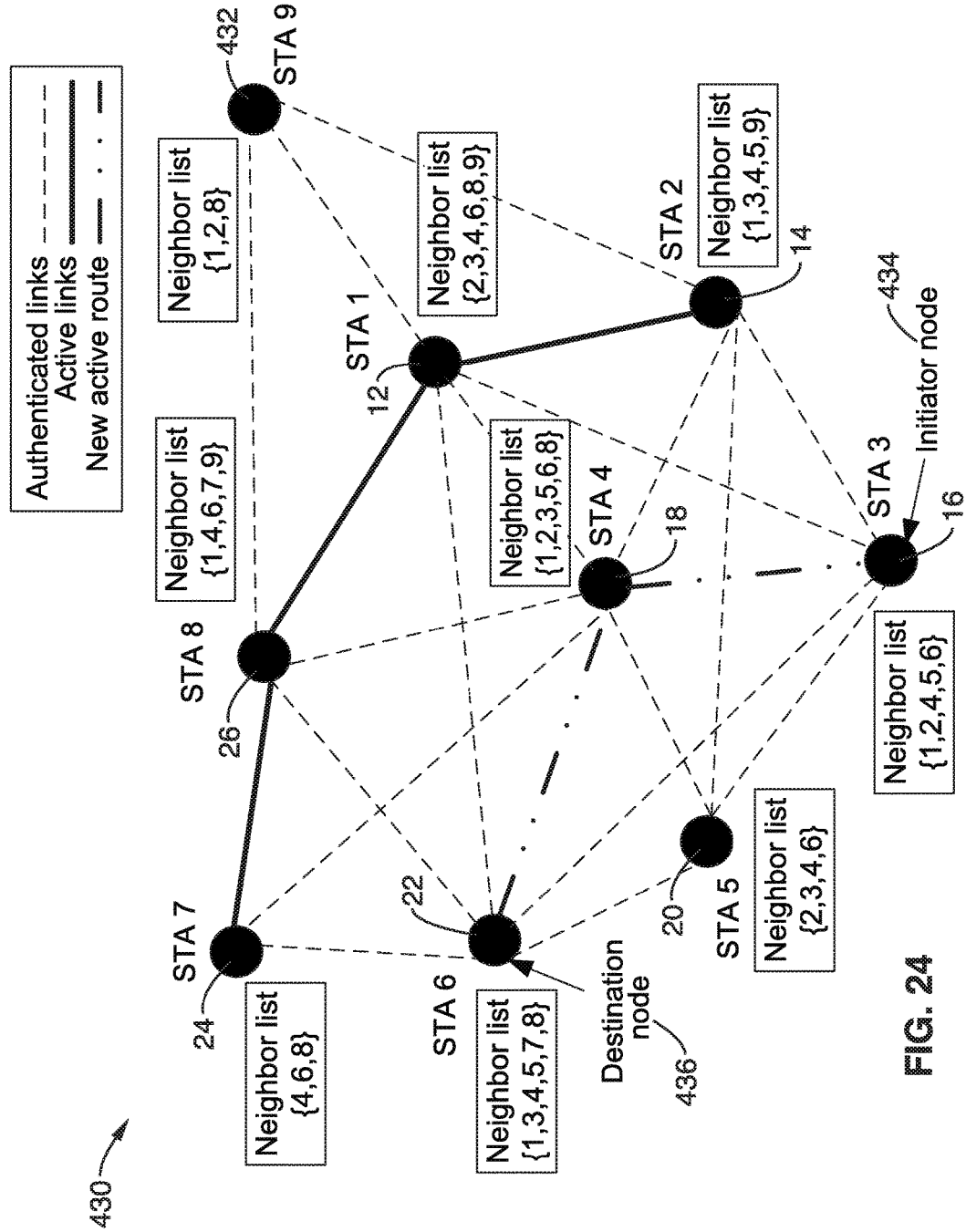
FIG. 24 is a node topology diagram showing orthogonal router synchronization according to an embodiment of the present disclosure.
Figure 25:
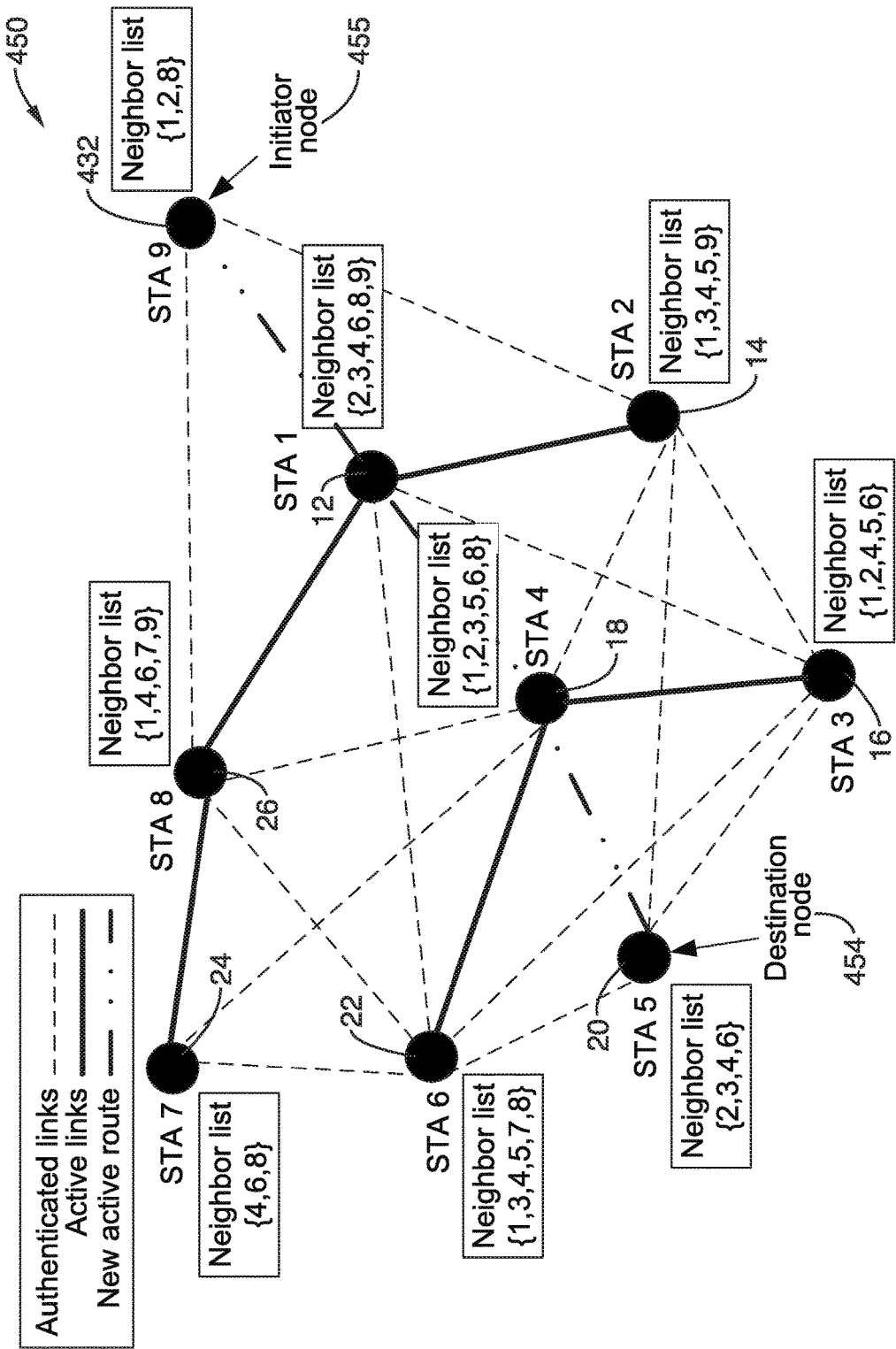
FIG. 25 is a node topology diagram showing synchronization for overlapping routes according to an embodiment of the present disclosure.

FIG. 24 and FIG. 25 illustrate example embodiments 430, 450 of a new route being initiated in a mesh network where active routes already exist. In these figures stations (STAs 1-8) 12, 14, 16, 18, 20, 22, 24, 26 are shown with STA 9 432, and an example neighbor list shown for each. Links are shown marked as being authenticated links, active links, or a new active route seen from initiator node 434 at STA 3 16 to destination node 436 at STA 6 22.

As discussed before, throughout the route setup, RRES should carry information about nodes in the selected route that have their clock already synchronized to other nodes (being part of another active route). Also RRES can carry information about nodes of special status that are favored, or are requesting to be a clock master.

In reference to FIG. 24, the initiator 434 (STA 3 16) receives all this information from all mesh nodes in the newly formed route and makes a decision whether it will be the clock master or another mesh node in the selected route will serve as a clock master based on the information forwarded in the RRES. The routes (intended route to STA 6 22, and active links between STA 2 14, STA 1 12, STA 8 26 and STA 7 24) are not overlapping, so the initiator STA 3 16 picks either itself or other mesh node in the new route to destination node 436 (STA 6 22). If a new node is selected, a clock master synchronization assignment frame is sent to this node. Once the node receives this frame, it starts sending synchronization signals to all nodes in the new setup route. The node receiving the frame will transmit future beacons to neighboring nodes in the route with synchronization data. All other beacons might not have the synchronization data. If the initiator is the clock master it will send the setup synchronization frame and adds the synchronization data to its beacons.

In FIG. 25, there are active links as shown in FIG. 24, an active link from STA 3 16 through STA 4 18 to STA 6 22, and a new active route from STA 9 432 as initiator 455 to STA 1 12 to STA 4 18 to STA 5 as destination 454. Thus, it is seen that the new active route overlaps the existing routes, so the initiator picks either itself or other mesh node in the new route. Nodes in the other routes that are already synchronized with other parts of the network and they report this in the RRES. The initiator receives the list of nodes in other subnetworks and nodes with special status that request the clock master role and make a decision of the clock master of the joint routes.

At the end of the process, the three routes will be synchronized to one clock master. The selection of which node is to be a clock master is performed at the initiator of the new route. The initiator can select itself in some cases.

If a new node is selected, a clock master synchronization assignment frame is sent to this node. Once the node receives this frame it starts sending synchronization signals to all nodes in the new setup route and to its subnetwork as well. Other nodes intersecting with the new route are responsible for synchronizing their subnetwork with the new clock master.

The node receiving the frame will transmit future beacons to neighboring nodes in the route with synchronization data. All other beacons might not have the synchronization data. The present disclosure can also be configured to utilize other forms of forwarding the synchronization signals. If the initiator is the clock master, it will send the setup synchronization frame, announce itself as the clock master and add the synchronization data to its beacons, while other synchronization signaling can be considered as well.

3.6. Frame Format

3.6.1. Route Request frame (RREQ)

FIG. 26 illustrates an example embodiment 470 of an RREQ frame. This frame is sent from a node to another node to request the other node to find a route to a destination node. If the destination node is the receiving node, a route response frame should be generated. If the destination node is not the receiving node, the receiving node regenerates a route request frame and forward it to all but the nodes it received a route request from.

In order to add beamforming capabilities to this frame, the frame is sent from all or some directional beams and carries a neighbor ID list and the best transmit beam ID of that neighbor if it was learned from the preceding received beacons frames. The frame carries the beam ID of the beam it is transmitted from. Some other information that can help in training can be included in the frame, such as number of training TX sectors, number of training RX sectors, or similar. The field of the RREQ frame are described below.

Neighbors ID list: List of neighbors this frame is directed to. Any neighbor receiving this frame checks if its own ID is in this list. That is to say that the receiver checks if its' (the neighbor node itself) ID matches one of the IDs listed in the received packet, to know if the packet is sent to this receiver. If the neighbor ID is matching, the receiving node processes the frame.

Neighbor best TX beam list: The best TX beam associated with the neighbors listed in the "Neighbor ID list" if it is available. This information is typically acquired from the beacon frames.

Total number of transmitting training sectors: This is the total number of transmit sectors used by the STA transmitting this element for beamform training. This number of training sectors value is used by the receiving node to set the beamforming period and adjust beamforming parameters.

Total number of receiving training sectors: Total number of receive sectors used by the STA transmitting this element for beamform training. This number is used by the receiving node to set the beamforming period and adjust beamforming parameters.

Number of training cycles: The number of cycles the training initiator will repeat the training pattern. This number is used by the receiving node to set the beamforming period and adjust beamforming parameters.

DMG antenna reciprocity: Antenna reciprocity is assumed. The sectors used for transmission will be used for reception. This number is used by the receiving node to set the beamforming period and adjust beamforming parameters.

3.6.2. Route Response Frame (RRES)

FIG. 27 illustrates an example embodiment 480 of an RRES frame. This frame is sent from a node to another node to respond to route request frames. If the source node is the receiving node, a route response frame terminates at this node. If the source node is not the receiving node, the receiving node calculates the path metric and forwards the route response frame after updating its field to all but the nodes it received a route response from.

In order to add beamforming capabilities to this frame, the frame is sent from all or some directional beams and carries the neighbor ID list and the best transmit beam ID of that neighbor if it was learned from the received RREQ frame or received beacons before. The frame should carry the beam ID of the beam it is transmitted from. Some other information that can help in training can be added to the frame, for example number of training TX sectors, number of training RX sectors, or other information as desired. The RRES frame contains the following fields.

Neighbors ID list: List of neighbors that this frame is directed to. Any neighbor receiving this frame checks if its own ID is in this list. If neighbor ID is matching, the receiving node processes the frame Neighbor best TX beam list: The best TX beam associated with the neighbors listed in the "Neighbor ID list". This information is typically acquired from the received RREQ frames or beacons frames.

Total number of transmitting training sectors: Total number of transmit sectors used by the STA transmitting this element for beamform training. This number is used by the receiving node to set the beamforming period and adjust beamforming parameters.

Total number of receiving training sectors: Total number of receive sectors used by the STA transmitting this element for beamform training. This number is used by the receiving node to set the beamforming period and adjust beamforming parameters.

Number of training cycles: The number of cycles the training initiator will repeat the training pattern. This number is used by the receiving node to set the beamforming period and adjust beamforming parameters.

DMG antenna reciprocity: Antenna reciprocity is assumed, with the sectors used for transmission being the sectors used for reception. This number is used by the receiving node to set the beamforming period and adjust beamforming parameters.

3.6.3. Route Response ACK frame

Figure 28:
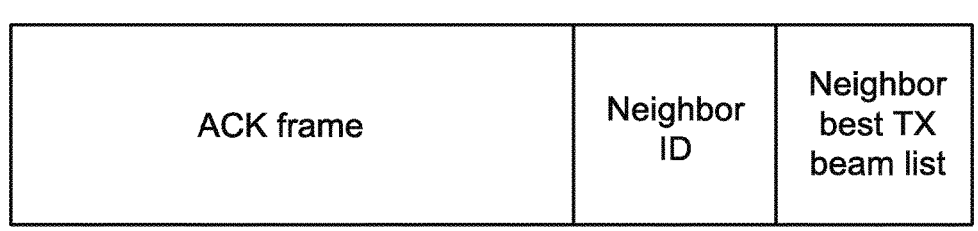
FIG. 28 is a data field diagram of the RRES ACK frame format according to an embodiment of the present disclosure.

FIG. 28 illustrates an example embodiment 490 of an RRES ACK frame. This is an acknowledgement (ACK) frame that is unicasted to acknowledge the reception of the RRES frame. This ACK frame can carry information that helps in the beamforming process. The neighbor ID and the best TX beam ID of that neighbor is added to that frame, this information is learned from the received RRES frame. Fields in the RRES ACK frame are outlined as follows.

Neighbor ID: The neighbor ID indicates where the ACK is sent to. Any neighbor receiving this frame checks if its' (the neighbor node itself) ID matches one of the IDs listed in the received packet. This is to know if the packet is sent to this receiver. If neighbor ID is matching, the receiving node processes the frame.

Neighbor best TX beam list: The best TX beam associated with the neighbor ID. This information is typically acquired from the received RRES frames or beacons frames.

3.6.4. Clock Master Synchronization Assignment Request

Figure 29:
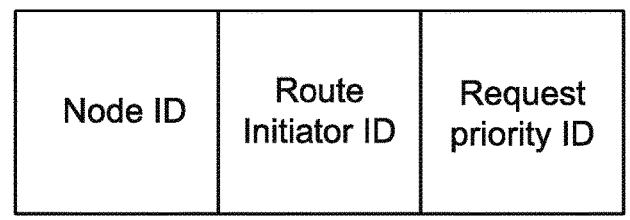
FIG. 29 is a data field diagram of a clock master synchronization assignment request according to an embodiment of the present disclosure.

FIG. 29 illustrates an example embodiment 500 of a clock master synchronization frame. This frame is sent by a node in route path to the route setup initiator to request being the clock master of this route, and has the following fields.

Node ID: ID of the node requesting to be the clock master. The initiator uses this ID to pick the clock master of the new route among itself and other nodes sending that request.

Route initiator ID: ID of the route initiator as the node where this request is directed to.

Request priority ID: A predefined value that represent the reason why the node is requesting to be a clock master. This information is used by the route initiator to pick the node which will act as a clock master for the route.

3.6.5. Clock Master Synchronization Assignment Response

Figure 30:
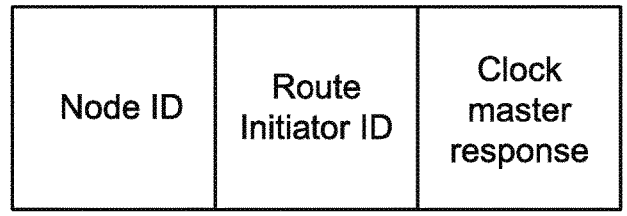
FIG. 30 is a data field diagram of a clock master synchronization assignment response according to an embodiment of the present disclosure.

FIG. 30 illustrates an example embodiment 510 of an clock master synch assignment response, having the following fields.

Node ID: ID of the node requesting to be the clock master. This is the node where this response is directed to.

Route initiator ID: ID of the route initiator. This is the node transmitting this message Clock master response: This field indicates if the node is the clock master of the route. If True, the node starts acting as a clock master of the route. If False, the node is expecting other node to provide synchronization information.

3.6.6. Clock Master Synchronization Assignment ACK

Figure 31:
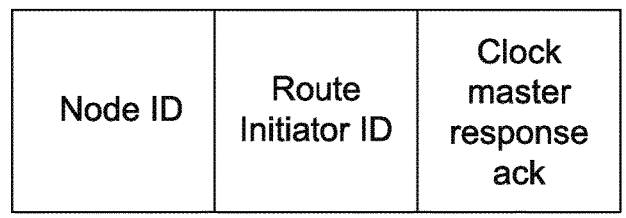
FIG. 31 is a data field diagram of a clock master synchronization assignment response ACK according to an embodiment of the present disclosure.

FIG. 31 illustrates an example embodiment 520 of an clock master synch assignment ACK frame. This frame acknowledges the reception of the clock master synchronization assignment response. It is to inform the route setup initiator node of accepting and starting the role of maintain synchronization through the route, and has the following fields.

Node ID: ID of the node requesting to be the clock master. This is the node transmitting this message.

Route initiator ID: ID of the route initiator. This is the node where this ACK is directed to.

Clock master response ACK: If True, the node is acknowledging the reception of the response frame and stating it is role as the new clock master. If False, the node is acknowledging the reception of the response and stating that it is not serving as a clock master of the route.

4. Summary of Disclosure Elements

The following is a partial summary of aspects associated with the present disclosure. Nodes are configured for forming a mesh network without network-wide synchronization or forming active links between potential neighbors. Synchronization and active links are established once a data transmission session is triggered and initiated by the route setup procedure. Every time a new node is joining the network it is authenticated and a list of available neighboring nodes is maintained. The new node is added to other mesh node lists as well once it has joined the network. Links are established as needed based on information collected about the available neighboring nodes. Upon data session initiation, route setup is initiated and mesh nodes form the link between the source node and destination node through other mesh nodes. The link formation includes both beamforming and synchronization. If the new route does not intersect with any currently active route, then the new route established in the mesh network will be independently synchronized with the active route initiator. If the new established route intersects with other active routes, where nodes will need to serve both routes, then the new route is preferably synchronized with all intersecting routes. The new master clock can be selected among all interesting routes and the new master starts sending synchronization signals and nodes propagate this signal through all routes. The new session initiator can be considered automatically the new master clock.

5. General Scope of Embodiments

The enhancements described in the presented technology can be readily implemented within various wireless (e.g., mmWave) transmitters, receivers and transceivers. It should also be appreciated that modern wireless transmitters, receivers and transceivers are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with various modern wireless communication devices. The presented technology is non-limiting with regard to memory and computer-readable media, insofar as these are non-transitory, and thus not constituting a transitory electronic signal.

It will also be appreciated that the computer readable media (memory storing instructions) in these computational systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a mesh network, comprising: (a) a wireless communication circuit configured for wirelessly communicating with other wireless communication stations utilizing directional millimeter-wave (mmW) communications having a plurality of antenna pattern sectors each having different transmission directions; (b) a processor coupled to said wireless communication circuit within a station configured for operating on the mesh network; (c) a non-transitory memory storing instructions executable by the processor; and (d) wherein said instructions, when executed by the processor, perform steps comprising: (d)(i) operating said station as a peer station on said mesh network for determining information about neighboring peer stations on the mesh network; (d)(ii) forming nodes into a mesh network without network-wide synchronization and without needing to form active links between potential neighbors; and (d)(iii) establishing synchronization and active links once a data transmission session is triggered and initiated by the route setup procedure.

2. The apparatus of any preceding or following embodiment, wherein said wireless communication circuit is also configured for wirelessly communicating with other wireless communication stations utilizing sub-6 GHz wireless communication.

3. The apparatus of any preceding or following embodiment, wherein said instructions when executed by the processor further perform steps comprising authenticating a new node when it is joining the mesh network, and maintaining a list of available neighboring nodes at each node in the mesh network.

4. The apparatus of any preceding or following embodiment, wherein said instructions when executed by the processor further perform steps comprising adding said new node to other mesh node lists once it has joined the mesh network, with links established with other nodes once needed for performing data communication in a data session, with these links established based on information collected about available neighboring nodes.

5. The apparatus of any preceding or following embodiment, wherein said instructions when executed by the processor further perform steps comprising initiating route setup upon initiating a data session, and during route setup mesh nodes are configured for forming links of said data session between source node and destination node by routing through other mesh nodes, with a link formation process comprising both beamforming and synchronization operations.

6. The apparatus of any preceding or following embodiment, wherein said instructions when executed by the processor further perform steps comprising independently synchronizing new routes established in said mesh network with the active route initiator in situations in which said new route is not intersecting with any currently active route.

7. The apparatus of any preceding or following embodiment, wherein said instructions when executed by the processor further perform steps comprising synchronizing said new route with all intersecting routes in situations in which said new route is intersecting with other active routes where nodes are configured to serve both routes.

8. The apparatus of any preceding or following embodiment, wherein said instructions when executed by the processor further perform steps comprising selecting a new master clock among all intersecting routes, with said new master clock configured for starting to send a synchronization signal and other nodes configured for propagating this synchronization signal through all routes.

9. The apparatus of any preceding or following embodiment, wherein said instructions when executed by the processor further perform steps comprising automatically establishing a new session initiator as said new master clock.

10. An apparatus for wireless communication in a mesh network, comprising: (a) a wireless communication circuit configured for wirelessly communicating with other wireless communication stations utilizing directional millimeter-wave (mmW) communications having a plurality of antenna pattern sectors each having different transmission directions; (b) a processor coupled to said wireless communication circuit within a station configured for operating on the mesh network; (c) a non-transitory memory storing instructions executable by the processor; and (d) wherein said instructions, when executed by the processor, perform steps comprising: (d)(i) operating said station as a peer station on said mesh network for determining information about neighboring peer stations on the mesh network; (d)(ii) forming nodes into a mesh network without network-wide synchronization and without needing to form active links between potential neighbors; (d)(iii) authenticating a new node when it is joining the mesh network, and maintaining a list of available neighboring nodes at each node in the mesh network; and (d)(iv) establishing synchronization and active links once a data transmission session is triggered and initiated by the route setup procedure.

11. The apparatus of any preceding or following embodiment, wherein said wireless communication circuit is also configured for wirelessly communicating with other wireless communication stations utilizing sub-6 GHz wireless communication.

12. The apparatus of any preceding or following embodiment, wherein said instructions when executed by the processor further perform steps comprising adding said new node to other mesh node lists once it has joined the mesh network, with links established with other nodes once needed for performing data communication in a data session, with these links established based on information collected about available neighboring nodes.

13. The apparatus of any preceding or following embodiment, wherein said instructions when executed by the processor further perform steps comprising initiating route setup upon initiating a data session, and during route setup mesh nodes are configured for forming links of said data session between source node and destination node by routing through other mesh nodes, with a link formation process comprising both beamforming and synchronization operations.

14. The apparatus of any preceding or following embodiment, wherein said instructions when executed by the processor further perform steps comprising independently synchronizing new routes established in said mesh network with the active route initiator in situations in which said new route is not intersecting with any currently active route.

15. The apparatus of any preceding or following embodiment, wherein said instructions when executed by the processor further perform steps comprising synchronizing said new route with all intersecting routes in situations in which said new route is intersecting with other active routes where nodes are configured to serve both routes.

16. The apparatus of any preceding or following embodiment, wherein said instructions when executed by the processor further perform steps comprising selecting a new master clock among all intersecting routes, with said new master clock configured for starting to send a synchronization signal and other nodes configured for propagating this synchronization signal through all routes.

17. The apparatus of any preceding or following embodiment, wherein said instructions when executed by the processor further perform steps comprising automatically establishing a new session initiator as said new master clock.

18. A method of performing wireless communication in a mesh network, comprising: (a) operating a wireless communication circuit, a station, configured for wirelessly communicating, with directional millimeter-wave (mmW) communications using a plurality of antenna pattern sectors each having different transmission directions, with other wireless communication stations; (b) operating said station as a peer station for determining information about neighboring peer stations; (c) forming nodes into a mesh network without network-wide synchronization and without needing to form active links between potential neighbors; and (d) establishing synchronization and active links once a data transmission session is triggered and initiated by the route setup procedure.

19. The method of any preceding or following embodiment, further comprising wirelessly communicating with other wireless communication stations utilizing sub-6 GHz wireless communication.

20. The method of any preceding or following embodiment, further comprising authenticating a new node when it is joining the mesh network, and maintaining a list of available neighboring nodes at each node in the mesh network.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a mesh network, comprising:
   (a) a wireless communication circuit configured for wirelessly communicating with other wireless communication stations utilizing directional millimeter-wave (mmW) communications having a plurality of antenna pattern sectors each having different transmission directions;

(b) a processor coupled to said wireless communication circuit within a station configured for operating on the mesh network;

(c) a non-transitory memory storing instructions executable by the processor; and (d) wherein said instructions, when executed by the processor, perform steps comprising:

(i) operating said station as a peer station on said mesh network for determining information about neighboring peer stations on the mesh network;

(ii) forming nodes into a mesh network without network-wide synchronization and without needing to form active links between potential neighbors; and (iii) establishing synchronization and active links once a data transmission session, from an initiator station to a destination station, is triggered and initiated by a route setup procedure;

(iv) wherein said synchronization is established on an active route or backup route, by propagating a synchronization signal from the initiator station through the established active route or backup route; and (v) wherein during said route setup procedure route response frames are utilized for carrying information about stations along the selected route whose clocks are already synchronized as being part of another route.

2. The apparatus as recited in claim 1, wherein said wireless communication circuit is also configured for wirelessly communicating with other wireless communication stations utilizing sub-6 GHz wireless communication.

3. The apparatus as recited in claim 1, wherein said instructions when executed by the processor further perform steps comprising authenticating a new node when it is joining the mesh network, and maintaining a list of available neighboring nodes at each node in the mesh network.

4. The apparatus as recited in claim 1, wherein said instructions when executed by the processor further perform steps comprising adding said new node to other mesh node lists once it has joined the mesh network, with links established with other nodes once needed for performing data communication in a data session, with these links established based on information collected about available neighboring nodes.

5. The apparatus as recited in claim 1, wherein said instructions when executed by the processor further perform steps comprising initiating route setup upon initiating a data session, and during route setup mesh nodes are configured for forming links of said data session between source node and destination node by routing through other mesh nodes, with a link formation process comprising both beamforming and synchronization operations.

6. The apparatus as recited in claim 5, wherein said instructions when executed by the processor further perform steps comprising independently synchronizing new routes established in said mesh network with the active route initiator in situations in which said new route is not intersecting with any currently active route.

7. The apparatus as recited in claim 5, wherein said instructions when executed by the processor further perform steps comprising synchronizing said new route with all intersecting routes in situations in which said new route is intersecting with other active routes where nodes are configured to serve both routes.

8. The apparatus as recited in claim 7, wherein said instructions when executed by the processor further perform steps comprising selecting a new master clock among all intersecting routes, with said new master clock configured for starting to send a synchronization signal and other nodes configured for propagating this synchronization signal through all routes.

9. The apparatus as recited in claim 8, wherein said instructions when executed by the processor further perform steps comprising automatically establishing a new session initiator as said new master clock.

10. An apparatus for wireless communication in a mesh network, comprising:

(a) a wireless communication circuit configured for wirelessly communicating with other wireless communication stations utilizing directional millimeter-wave (mmW) communications having a plurality of antenna pattern sectors each having different transmission directions;

(b) a processor coupled to said wireless communication circuit within a station configured for operating on the mesh network;

(c) a non-transitory memory storing instructions executable by the processor; and (d) wherein said instructions, when executed by the processor, perform steps comprising:

(i) operating said station as a peer station on said mesh network for determining information about neighboring peer stations on the mesh network;

(ii) forming nodes into a mesh network without network-wide synchronization and without needing to form active links between potential neighbors;

(iii) authenticating a new node when it is joining the mesh network, and maintaining a list of available neighboring nodes at each node in the mesh network; and (iv) establishing synchronization and active links once a data transmission session, from an initiator station to a destination station, is triggered and initiated by a route setup procedure;

(v) wherein said synchronization is established on an active route or backup route, by propagating a synchronization signal from the initiator station through the established active route or backup route; and (vi) wherein during said route setup procedure route response frames are utilized for carrying information about stations along the selected route whose clocks are already synchronized as being part of another route.

11. The apparatus as recited in claim 10, wherein said wireless communication circuit is also configured for wirelessly communicating with other wireless communication stations utilizing sub-6 GHz wireless communication.

12. The apparatus as recited in claim 10, wherein said instructions when executed by the processor further perform steps comprising adding said new node to other mesh node lists once it has joined the mesh network, with links established with other nodes once needed for performing data communication in a data session, with these links established based on information collected about available neighboring nodes.

13. The apparatus as recited in claim 10, wherein said instructions when executed by the processor further perform steps comprising initiating route setup upon initiating a data session, and during route setup mesh nodes are configured for forming links of said data session between source node and destination node by routing through other mesh nodes, with a link formation process comprising both beamforming and synchronization operations.

14. The apparatus as recited in claim 13, wherein said instructions when executed by the processor further perform steps comprising independently synchronizing new routes established in said mesh network with the active route initiator in situations in which said new route is not intersecting with any currently active route.

15. The apparatus as recited in claim 13, wherein said instructions when executed by the processor further perform steps comprising synchronizing said new route with all intersecting routes in situations in which said new route is intersecting with other active routes where nodes are configured to serve both routes.

16. The apparatus as recited in claim 15, wherein said instructions when executed by the processor further perform steps comprising selecting a new master clock among all intersecting routes, with said new master clock configured for starting to send a synchronization signal and other nodes configured for propagating this synchronization signal through all routes.

17. The apparatus as recited in claim 16, wherein said instructions when executed by the processor further perform steps comprising automatically establishing a new session initiator as said new master clock.

18. A method of performing wireless communication in a mesh network, comprising:

(a) operating a wireless communication circuit, a station, configured for wirelessly communicating, with directional millimeter-wave (mmW) communications using a plurality of antenna pattern sectors each having different transmission directions, with other wireless communication stations;

(b) operating said station as a peer station for determining information about neighboring peer stations;

(c) forming nodes into a mesh network without network-wide synchronization and without needing to form active links between potential neighbors; and (d) establishing synchronization and active links once a data transmission session is triggered, from an initiator station to a destination station, and initiated by a route setup procedure;

(e) wherein said synchronization is established on an active route or backup route, by propagating a synchronization signal from the initiator station through the established active route or backup route; and (f) wherein during said route setup procedure route response frames are utilized for carrying information about stations along the selected route whose clocks are already synchronized as being part of another route.

19. The method as recited in claim 18, further comprising wirelessly communicating with other wireless communication stations utilizing sub-6 GHz wireless communication.

20. The method as recited in claim 18, further comprising authenticating a new node when it is joining the mesh network, and maintaining a list of available neighboring nodes at each node in the mesh network.

* * * * *